INVENTORS
HOEL L. BOWDITCH
DAVID H. FULLER
MEAD BRADNER
BY Curtis, Morris + Safford
ATTORNEYS April 6, 1954 H. L. BOWDITCH ET AL 2,674,513

INDUSTRIAL RECORDING MECHANISM

Filed March 24, 1949

11 Sheets-Sheet 2

INVENTORS
HOEL L. BOWDITCH
DAVID H. FULLER
MEAD BRADNER

BY Curtis, Morris & Safford
ATTORNEYS

April 6, 1954 H. L. BOWDITCH ET AL 2,674,513

INDUSTRIAL RECORDING MECHANISM

Filed March 24, 1949

11 Sheets-Sheet 3

INVENTORS
HOEL L. BOWDITCH
DAVID H. FULLER
MEAD BRADNER
BY Curtis, Morris & Safford
ATTORNEYS INVENTORS
HOEL L. BOWDITCH
DAVID H. FULLER
MEAD BRADNER
BY Curtis, Morris & Safford
ATTORNEYS April 6, 1954 H. L. BOWDITCH ET AL 2,674,513

INDUSTRIAL RECORDING MECHANISM

Filed March 24, 1949

11 Sheets-Sheet 5

INVENTORS
HOEL L. BOWDITCH
DAVID H. FULLER
MEAD BRADNER

BY Curtis, Morris & Safford
ATTORNEYS

INVENTORS
HOEL L. BOWDITCH
DAVID H. FULLER
MEAD BRADNER
BY Curtis, Morris & Safford
ATTORNEYS INVENTORS
HOEL L. BOWDITCH
DAVID H. FULLER
MEAD BRADNER
BY Curtis, Morris & Safford
ATTORNEYS April 6, 1954 H. L. BOWDITCH ET AL 2,674,513

INDUSTRIAL RECORDING MECHANISM

Filed March 24, 1949 11 Sheets-Sheet 8

INVENTORS
HOEL L. BOWDITCH
DAVID H. FULLER
MEAD BRADNER

BY Curtis, Morris + Safford
ATTORNEYS

INVENTORS
HOEL L. BOWDITCH
DAVID H. FULLER
MEAD BRADNER
BY Curtis, Morris & Safford
ATTORNEYS April 6, 1954

H. L. BOWDITCH ET AL 2,674,513

INDUSTRIAL RECORDING MECHANISM

Filed March 24, 194S

11 Sheets-Sheet 10

INVENTORS
HOEL L. BOWDITCH
DAVID H. FULLER
MEAD BRADNER
BY Curtis, Morris & Safford
ATTORNEYS April 6, 1954 H. L. BOWDITCH ET AL 2,674,513

INDUSTRIAL RECORDING MECHANISM

Filed March 24, 1949

11 Sheets-Sheet 11

INVENTORS
HOEL L. BOWDITCH
DAVID H. FULLER
MEAD BRADNER

BY Curtis, Morris & Safford
ATTORNEYS

Patented Apr. 6, 1954

2,674,513

UNITED STATES PATENT OFFICE 2,674,513

INDUSTRIAL RECORDING MECHANISM

Hoel L. Bowditch, Foxboro, David H. Fuller, Wrentham, and Mead Bradner, Foxboro, Mass., assignors to The Foxboro Company, Foxboro, Mass.

Application March 24, 1949, Serial No. 83,272

23 Claims. (Cl. 346—46)

This invention relates to industrial recorders for producing on round or strip charts records of variable conditions such as, for example, temperatures, flows, pressures, etc.

Recorders for this purpose are in wide use in many branches of industry. The oil, chemical, steel, milk and many other industries are large users of recording instruments. These instruments, though long used, have presented problems both to their manufacturers and users. The present invention provides satisfactory and useful solutions to several important problems.

In one type of conventional recording mechanism a pen arm carrying a pen is moved over a chart in accordance with the values of the condition being measured. The pen is in continuous contact with the chart and makes a continuous record and uses ink that flows to the pen point. This creates the problem of trying to keep the pen point supplied with liquid ink over twenty-four hours (or longer) periods without the possibility of the ink splashing onto or otherwise smudging the chart. The present invention provides for the first time a relatively low cost recording mechanism which may be made responsive to most any type of measuring element and which will make, on round charts or on strip charts, a substantially continuous smudge-proof record over a long period of time without requiring manual replenishment of the ink supply.

Another problem involves multi-record recorders, such as are used to record on a single chart the values of a number of different variables, i. e., a number of different pressures, temperatures, or flows, etc., or combinations thereof. Multi-record recorders are useful because they reduce the number of separate recording instruments otherwise required. This saves space, reduces the overall cost of the recording instrumentation, and provides at a conveniently viewable place the records of interrelated variables that for analysis or control purposes should be viewed on a single chart.

One conventional type of multi-record round chart instrument employs a plurality of pen arms each having a pen in continuous contact with a chart. Mechanical measuring elements such as bellows, or Bourdon tubes, floats, or even electrically or air-operating measuring mechanisms are used to move the pen arms. Such multi-record instruments, although extensively used, have several disadvantages: The pens on the several arms have to be offset so that they may swing past each other. For this reason only one of the pens of a group can be aligned with customary time arcs on the chart. Also the pens carry liquid inks of different colors, and when two pens record close to or actually swing past each other, the ink from one pen may run into that of another, thereby confusing the colors. The disadvantage of offset pens, and the possibility of ink transfer from one to another is so important that the multi-record instruments have been constructed to limit the motion of the several pens so that they cannot swing past each other. In this way the pens may be aligned on the same time arc but special charts are required having a separate circular section for each pen. This construction overcomes the above disadvantages, but introduces another; namely, that the reduced motion of the pen requires condensed chart scales, and the accuracy of the records made is likely to be less than that produced by pens movable over the full chart.

Another object is to provide a relatively inexpensive multi-record recorder responsive to any type of measuring element and which eliminates the problems above, and in which (1) there is only one pen arm to record the values of the several conditions being measured, (2) there is no possibility of losing color identification, and (3) there is no extraneous force or mechanism affecting the accuracy of the records.

Another type of conventional multi-record recorder records intermittently. Printing mechanism, having a number of printing members, is moved across a strip chart. Switching mechanism successively switches a single electrically operated measuring mechanism from one measuring element to another, rotates the printing mechanism, and causes it to print periodically on the chart the position of the printing mechanism as determined by the measuring mechanism.

One of the problems of such periodically operating multi-record instruments is that of obtaining a sufficiently rapid printing cycle to obtain substantially continuous individual records. This problem becomes serious when such recorders are used to record conditions that change fairly rapidly. Merely increasing the speed of the conventional instruments is not a solution. The conventional designs utilize many moving parts having both sliding and rotating movement and subject to relatively large loads. Increasing the speed of such parts would prohibitively increase their wear and shorten their life. Also, the complicated structures of such conventional multi-record recorders have kept them expensive and for general use have limited them to strip chart applications.

Another object of the present invention is to provide a novel multi-record recorder of the intermittently printing type that is rapid in operation, has no rapidly moving parts, and is of simpler and less expensive construction than conventional multi-record instruments.

The present recorder employs an arm that carries a printing member and moves it over a chart in accordance with the value of the condition being recorded. For convenience we refer to the arm as a pen arm and the printing member as a pen. The pen arm is continually moved to an edge of the chart where a pen on the arm is either freshly inked or is exchanged for a different pen, whereupon the pen arm is returned to its condition-indicating position and is caused to print a record on the chart. When the mechanism is used as a multi-record recorder, the inking performed at the edge of the chart effects a color change; and simultaneously the measuring mechanism is switched to a different measuring element, or a different measuring mechanism is brought into operation.

During the printing operation the pen arm is mechanically disconnected from the mechanism by which the color characteristic of the pen is changed, so that at the time of printing the pen and pen arm are unaffected by any forces tending to impair the accuracy of the positioning of the pen arm by the measuring mechanism.

The invention is useful for round chart recording as well as for strip chart recording.

Other objects will be in part obvious and in part pointed out by reference to the drawings in which like reference characters refer to similar parts throughout.

Figure 1:
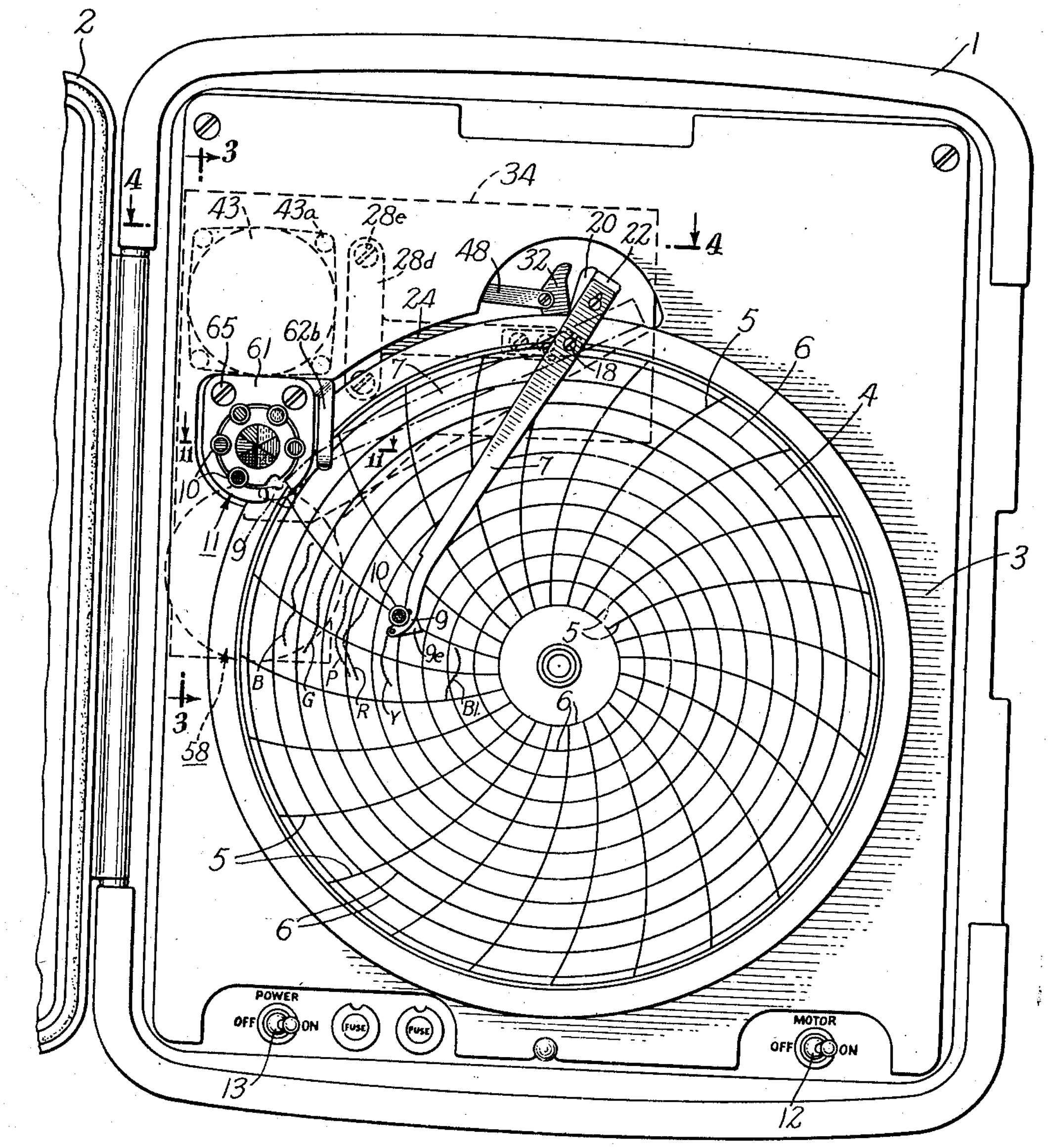
Figure 1 shows in front elevation a multi-record round chart recorder embodying the invention and mounted in a case, with the door of the instrument open.

Referring to Figure 1, the recording instrument is mounted in a case 1 normally closed by a cover 2 partly shown at the left. A removable round chart backing plate 3 provides backing for the usual chart 4 having radial time lines 5 and concentric index lines 6 representing values of pressures, temperatures, flows, etc.

A pen arm 7 is movable over chart 4 about an axis 18 in accordance with the value of a condition being measured. In this embodiment pen arm 7 carries at its free end a pen holder 9 and a pen 10, which when the pen arm is depressed, prints a dot on the chart to record the instantaneous value of the condition being measured.

At the left of the chart is a pen magazine generally indicated by numeral 11 holding six pens each of which may carry a distinctive color. Pen arm 7 is periodically swung to the magazine where a rotor in the magazine removes from pen holder 9 the pen 10 that has just printed, and replaces it with a fresh one. In the Figure 1 embodiment a novel construction is used for removably carrying the pen. The pen holder 9 is magnetized and holds its pen by magnetic force, and the magazine rotor pulls the pen from the holder and moves another to the holder. Simultaneously, switching mechanism, generally indicated at 58, disconnects the measuring mechanism (also herein called condition-measuring apparatus) from one measuring element and connects it to the next one. Pen arm 7 is then returned to the chart, is positioned in accordance with the value of that measuring element, and the pen is caused to print its position on the chart.

The operation is continuous and rapid. The structure of the present embodiment records every six seconds. The lines on the chart marked B, G, P, R, Y, and Bl are indicative of the type of records of six different conditions that the instrument might be producing on the chart.

At the lower right hand corner of the instrument a switch 12 is provided to turn on and off the motor that drives the recording mechanism. At the lower left a switch 13 serves to turn on and off the power to the electrically-operated condition-measuring apparatus not shown.

Figures 2, 15:
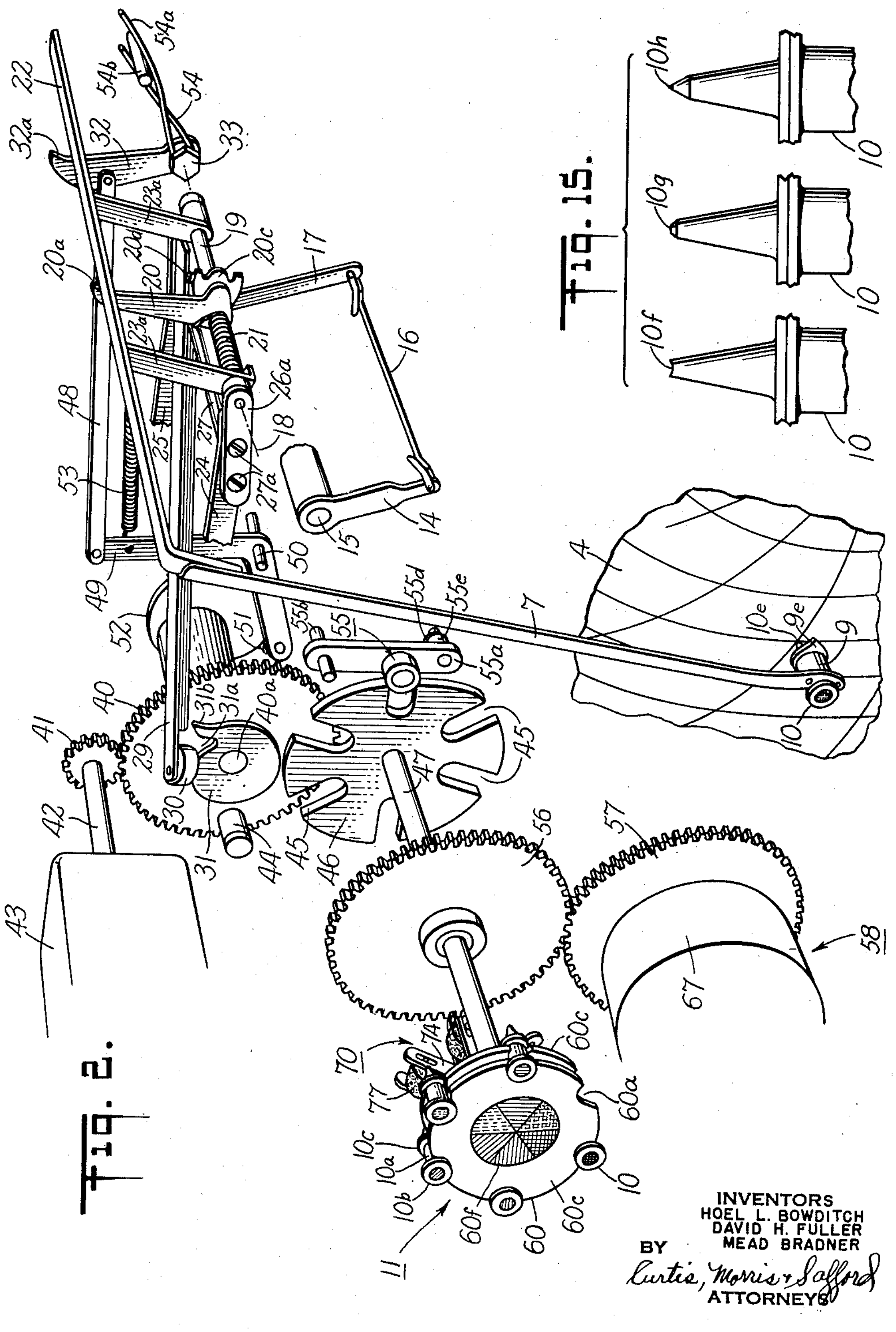
Figure 2 shows in perspective and partly diagrammatically an exploded view of operating parts of the multi-record recorder of Figure 1.
Figure 15 (Sheet 2) shows in enlarged detail different types of points of pens that may be used.

Turning now to Figure 2, an arm 14 is positioned about axis 15 by suitable electrically operated condition-measuring apparatus in accordance with the value of the condition being measured. Arm 14 through link 16 freely positions level 17 about axis 18. Lever 17 is secured to a shaft 19 freely rotatable in suitable bearings. Adjustably secured with respect to arm 17 and movable by it, is positioning arm 20, whose outer end has a face 20a constructed to engage and rotatably position a bail 22 supported from arms 23a, freely rotatable about axis 18. The bail extends forwardly and its forward end supports the pen arm 7. The force of gravity of pen arm 7 and a coil spring 21 continuously urges the bail counter-clockwise and against face 20a of positioning arm 20. In this manner the measuring mechanism positions the pen over the chart in accordance with the value of the condition being measured.

The pen arm and pen, suitably positioned by arm 20, are caused to print by moving the pen to the chart. To this end arms 23a supporting bail 22 are suitably rotatably supported from two spaced flexible spring arms 24 and 25 (Figure 4), supported from built-up posts 28, only one of which shows in Figure 4. Arms 24 and 25 are biased to move bail 22 inwardly, and so to move pen 10 into contact with the chart, but a cam-operated rigid printing lever 29, secured to the right end of arm 25 and extending leftward, normally holds the pen out of contact with the chart. At its left end, arm 29 carries a cam-follower 30 that rides on the side of a cam 31. Cam 31 is constantly driven counter-clockwise, and cam-follower 30, when riding on the side surface of cam 31, holds pen arm 7 forwardly and the pen forward of the chart. But when cam-follower 30 rides into an opening 31a in cam 31, the bias of arms 24 and 25 move the bail, pen arm, and pen sharply inwardly to cause the pen to strike against the chart and print the impression of the pen thereon. A tongue 31b on cam 31 guides cam-follower 30 to the side surface immediately following the printing operation.

When the pen arm moves toward the chart, the entire mechanism supported by arms 24 and 25 moves likewise, and connecting link 16, connecting arm 17 with arm 14 permits the relative axial movement of the two arms 14 and 17 without introducing inaccuracy into the position of pen arm 7. This is accomplished by axially positioning arm 17 on shaft 19 so that when the bail is moved into printing position, arm 17 moves into the plane of arm 14, and there is no misalignment of the arms at the instant the pen prints on the chart.

As shown in Figure 2, cam-follower 30 is just ready to ride into depression 31a, to cause the above-mentioned printing operation to take place, and bail 22 and pen arm 7 are being positioned by the condition-responsive mechanism through arm 20, arm 17, link 16, and arm 14.

After the printing operation (which in the present embodiment consumes approximately one-quarter of a second), mechanism immediately starts to swing pen arm 7 to the pen magazine at the outer edge of the chart, where the pen that has just printed is removed from pen holder 9, and a freshly inked pen is placed in the pen holder. The same mechanism then moves pen arm 7 back into contact with positioning arm 20 for the next printing position.

The mechanism of the Figure 1 embodiment for accomplishing this change of pens and the resulting replenishing of ink, will now be described. Referring to Figure 2, bail 22 is periodically swung clockwise about axis 18 by a driving arm 32 pivoted on stud shaft 33 on axis 18, and secured to a supporting plate 34 (top of Figure 4). Plate 34 is detachably secured to the inside of housing 1 and supports the drive, pen arm, pen magazine and switching mechanism as a unit. Driving arm 32 has a face 32a constructed to engage bail 22 when arm 32 moves clockwise from its starting position shown in Figure 2; and when bail 22 is so engaged, it too is swung clockwise and pen arm 7 is swung to the edge of the chart. Since arm 32 turns about the same axis as do arms 23a supporting bail 22, there is no sliding motion between face 32a and the bail. As pen arm 7 reaches its leftmost position shown in dotted lines in Figure 1, it moves pen holder 9 into a recess 61b (Figure 13) of magazine 11, and the pen carried by holder 9 enters a notch 60a in a rotor 60 of the magazine. Thereafter rotor 60 rotates one-sixth of a revolution, picks the pen off the pen holder, and moves a freshly inked pen thereto.

After pen holder 9 has received its freshly inked pen, driving arm 32 swings counter-clockwise and lowers bail 22 into contact with positioning member 20, and pen 10 is ready for its next printing operation.

Figures 5, 6:
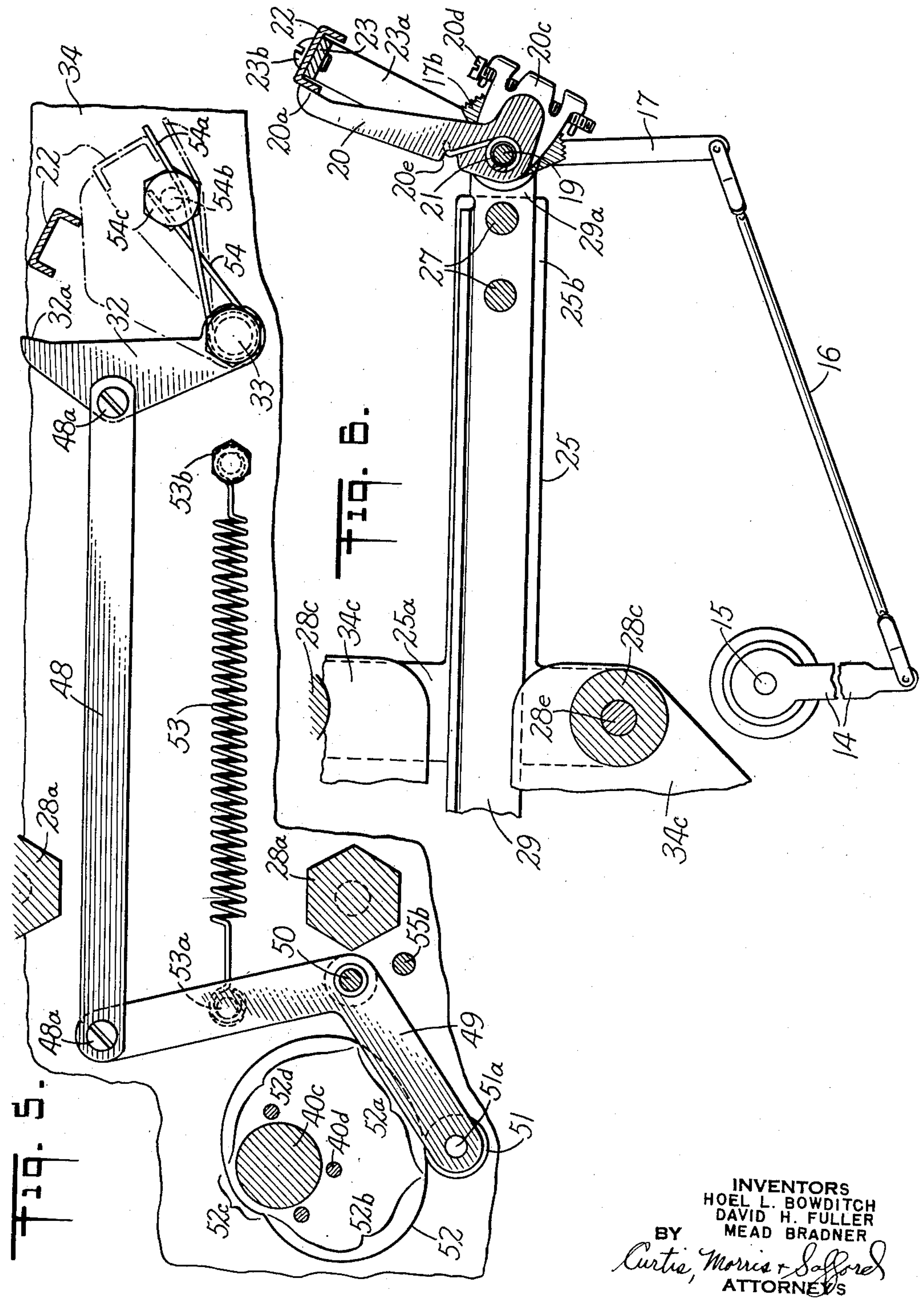
Figure 5 is an enlarged section taken on line 5—5 of Figure 3, and shows mechanism for swinging the pen arm to the edge of the chart (Figure 1) to exchange pens.
Figure 6 is a detail section taken on line 6—6 of Figure 4, and shows mechanism positioning the pen arm in accordance with the value of a condition to be recorded.

Referring to Figures 2 and 5, driving arm 32, to accomplish the above operation, is oscillated by a link 48 connected at one end to arm 32 and at its other end to the upper end of an L-shaped rocker arm 49 secured to a shaft 50. The lower end of arm 49 carries a cam-follower 51 which, under the influence of a spring 53, rides on the surface of a cam 52 secured to and constantly turned by spur gear 40. As cam 52 turns, cam-follower 51 rides in and out on cam 52. As cam-follower 51 rides into the depression on cam 52, it moves arm 32 clockwise, and drives pen arm 7 to the edge of the chart to present the penholder to the magazine. A dwell 52a on cam 52 holds the pen holder at the magazine while rotation of rotor 60 picks off the pen and delivers a freshly inked pen to the holder.

Referring now to the pen magazine, rotor 60 is rotated one-sixth of a revolution in each cycle, by a pin 44, mounted on the constantly driven gear 40. During each rotation of gear 40, the pin enters a notch 45 in a drive wheel 46 fixed to a shaft 47 on which rotor 60 is mounted. The pin forces wheel 46 to turn one-sixth of a revolution and leave the notch and wheel stationary. The gear 40 is driven by motor 43 through a shaft 42 and a pinion gear 41 meshing with gear 40.

A detent mechanism generally indicated at 55 accurately positions drive wheel 46 and rotor 60 respectively to align the next successive notch 45 for entry by pin 44, and to align rotor 60 with holder 9.

When the mechanism of Figure 2 is used as a multi-record recorder, the switching mechanism 58 is rotated one-sixth of a revolution at the same time rotor 60 is turned. This is accomplished by a gear 56, fixed on shaft 47 and meshing with and turning a gear 57 secured to the switching mechanism. Rotation of the switch mechanism connects the successive measuring elements to the condition-responsive mechanism.

As will be pointed out, positioning arm 20 that positions bail 22, or its mechanical equivalent, may be as shown a single member responsive to a single measuring mechanism which is switched from one measuring element to another; or a plurality of positioning arms may be employed, each permanently connected to its respective measuring element. When the latter construction is used, mechanism is provided to periodically select the arm that positions the bail and pen arm, and to hold the other positioning arms out of engagement with the bail.

Also, in another embodiment, the pen arm is swung to the magazine by the measuring mechanism itself, in which event the pick-up arm 32 may be eliminated.

The inking of the printing member (pen) carried by arm 7, may be advantageously performed by actually changing pens in the pen holder, or as will be pointed out, by utilizing a single pen permanently secured to the pen arm, which pen is wiped and re-inked after each printing operation. But in each embodiment the inking replenishing is advantageously accomplished at the edge of the chart. Also the mechanism is constructed to leave the printing member free of mechanical connections that might otherwise affect the accuracy of the records while the printing member is printing.

Having described the general operation of the embodiment shown in Figure 2, attention is now directed to the details of its construction.

The mechanism that supports and operates the pen arm, is mounted on supporting plate 34 (Figures 1, 3 and 4), removably secured to back 1a of housing 1 by bolts 34a, and spacer collars 34b which hold plate 34 forward of back 1a so that bearings, screw heads, etc. may extend from the back of plate 34 without contacting back 1a.

Figure 4:
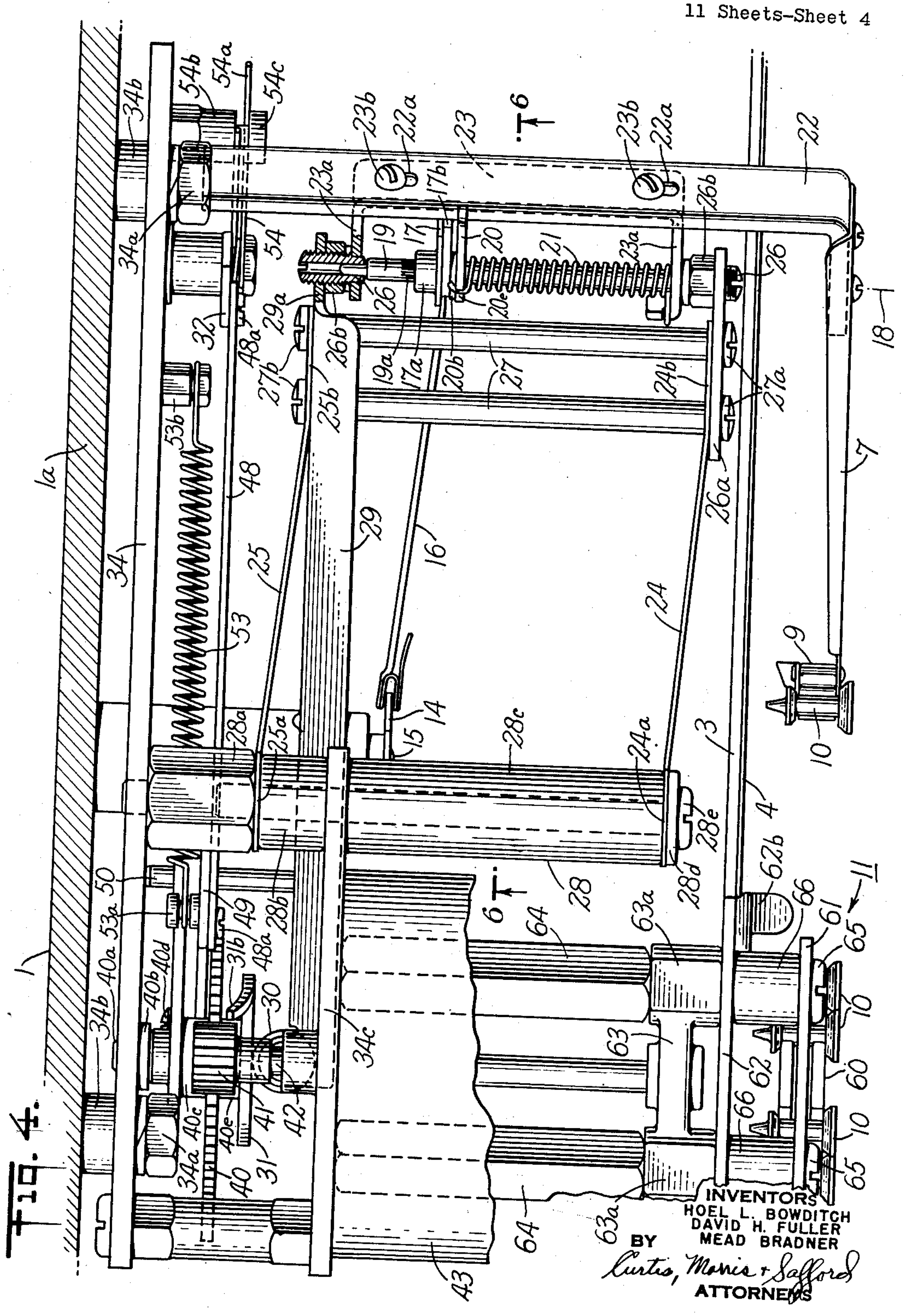
Figure 4 is an enlarged detail looking down on the recording mechanism from line 4—4 of Figure 1.

Referring to Figures 1 and 4, flexure arms 24 and 25, that support shaft 19 and pen arm 7 are T-shaped. The crosses 24a and 25a of these T-shaped flexures are conveniently secured to base 34 by two built-up columns 28, one of which is shown in Figure 4. Each column has a base section 28a suitably threaded into plate 34. Cross 25a is held between base sections 28a and spacers 28b. Columns 28 also support a plate 34c, held between spacers 28b and spacers 28c. Cross 24a is held between spacers 28c and a plate 28d. Spacers 28b and 28c of each column and plate 28d are held together by long screws 28e which extend through each column and thread into the bases 28a.

With this construction, the free ends of flexure arms 24 and 25 are positioned to locate the axis 18 (about which pen arm 7 swings) properly with respect to the time arcs of chart 4.

Referring to Figure 4, flexure arms 24 and 25 slant forwardly when the pen is held away from chart 4 by printing lever 29, but when they are released to move pen 10 against the chart, arms 24 and 25 straighten, and in their straightened position hold axis 18 on the locus of the centers of time arcs 5 of the chart. Free ends 24b and 25b of arms 24 and 25 do not slope at any time, and are rigidly secured with respect to each other by two spacers 27. End 24b is secured to spacers 27 by a plate 26a held by screws 27a threaded into spacers 27. End 25b is secured to spacers 27 by screws 27b which pass through end 25b, through the right end of printing lever 29, and thread into spacers 27 to secure lever 29 to arms 24 and 25.

As seen in Figure 4, the construction provides a parallelogram arrangement that holds axis 18 perpendicular to the chart as printing lever 29 moves the parts into and out of printing position.

Referring now to the structure supporting bail 22, positioning arm 20, and shaft 19; the reduced ends of shaft 19 are freely received in journals 26 (Figure 4), one is threaded through plate 26a, and the other is threaded through end 29a of lever 29. Lock nuts 26b secure the adjustment of the journals.

Arms 23a that sunpport bail 22 from shaft 19 are part of a U-frame 23 secured to the under side of bail 22 by screws 23b that extend through slots 22a in the bail and thread into the frame. Each arm 23a is freely supported from bearing surfaces provided on the outside of journals 26. The slots 22a permit axial adjustment of the bail along the frame to correctly space the pen holder with respect to chart 4 so that its pen contacts chart 4 with the correct amount of pressure when printing lever 29 moves the pen arm into printing position.

Referring now to the positioning arm 20 and its associated lever 14 by which bail 22 is positioned by the condition-measuring apparatus: lever 17 is suitably staked to a sleeve 17a (Figure 4) which itself is fixed to shaft 19 by a press fit over ridges 19a on the shaft. Refering to Figures 4 and 6, positioning arm 20 is rotatably adjustable with respect to lever 17. To this end a gear segment 17b is suitably fixed to lever 17. Positioning arm 20 carries a bushing 20b rotatable on shaft 19. Between arm 20 and gear segment 17b, and fixed to bushing 20b, is a worm screw support 20c carrying worm screw 20d which meshes with gear segment 17b. Arm 20 and support 20c are suitably fixed together as by welding. Turning screw 20d changes the angular relation between positioning arm 20 and lever 17, so that arm 20 may be brought into alignment with respect to the measuring mechanism properly to position pen arm 7 over chart 4 in accordance with the value of the condition being measured. This adjusting construction is disclosed in detail in Bowditch U. S. Patent application Serial No. 756,597, filed June 24, 1947, now Patent No. 2,500,657.

Referring to Figures 4 and 6, coil spring 21 around shaft 19 urges arm 20 toward bail 22 by having one end hooked in a notch 20e in arm 20, and its other end hooked in a similar notch in arm 23a. Spring 21 serves always to urge arm 20 and bail 22 into contact one with the other without imposing any force on the measuring element when the bail and arm are in contact. The spring is not strong and yields to permit bail 22 to be separated from arm 20 during the pen exchanging operation without placing a disrupting load on the measuring element.

The link connection between arm 14 and arm 17 is made as long as conveniently necessary to permit the free relative axial movement. As above described, the arms 14 and 17 are so axially aligned with respect to each other that the axial movement of arm 17 (when pen 10 moves into contact with the chart) moves arm 17 into the vertical plane containing arm 14. The connections between link 16 and the two arms 14 and 17 may be of any suitable construction, but are conveniently of the type shown, which is more fully disclosed in Bowditch United States patent application Serial No. 660,978, filed April 10, 1946, now Patent No. 2,561,969.

The slight pivotal movement of pen arm 7 produced when flexures 24 and 25 move the pen arm to and from the chart is reduced by locating the connection between link 16 and arm 14 close to the columns supporting the flexure, i. e., close to the vertical plane containing the effective pivot points of said flexures.

The foregoing construction by which pen arm 7 is supported imposes a negligible force on the measuring mechanism, and, at the same time, insures that such force as is imposed is substantially constant. The structure is simple to manufacture, and has a minimum of parts.

Figure 7:
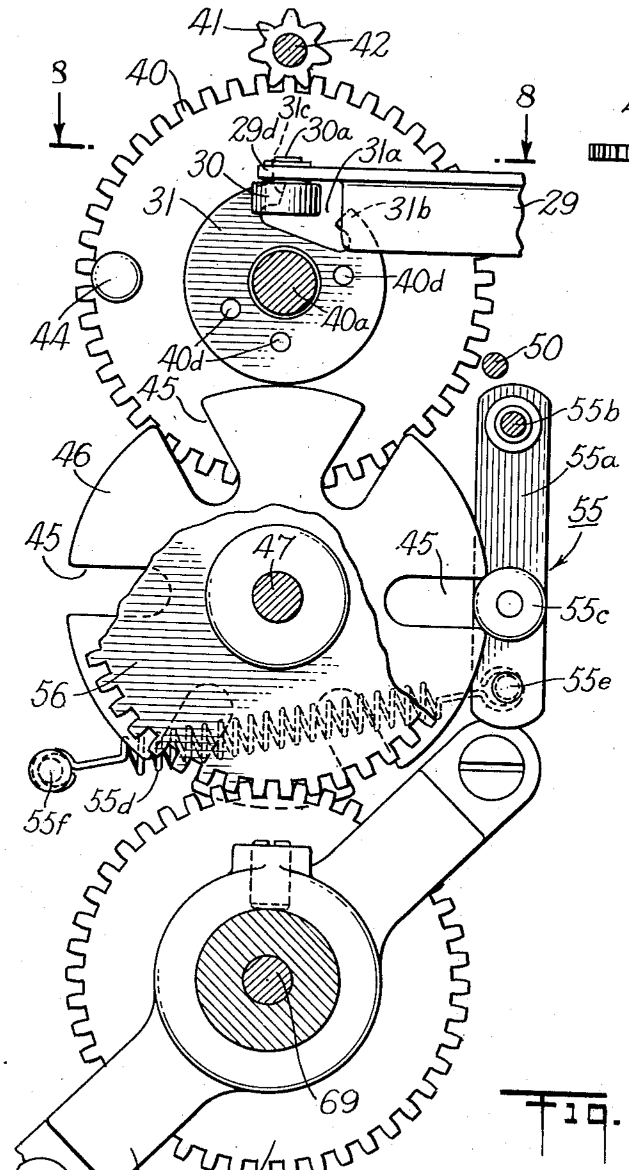
Figure 7 is a detail, taken on line 7—7 of Figure 3. It shows in the upper part a cam and cam-follower for depressing the pen arm periodically to print a record on the chart; in the midpart, detent mechanism for aligning switching mechanism, and for aligning the pen magazine properly to supply a fresh pen to the pen arm; and in the lower part, the outline of switching mechanism.
Figure 8:
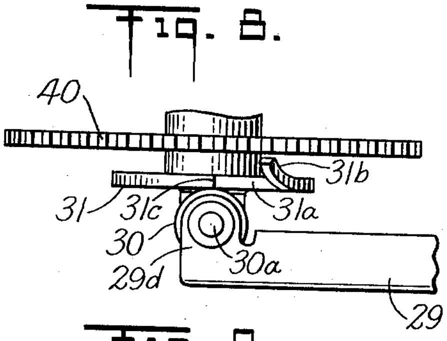
Figure 8 is a detail taken on line 8—8 of Figure 7, showing the cam and cam-follower.

Turning now to the mechanism by which printing lever 29 is periodically operated, and referring to Figures 7 and 8, lever 29 is kept light in weight but is made rigid by its L-shaped cross section. The cam-follower 30 carried by lever 29 is rotatably supported on a stud shaft 30a suitably secured to end 29d of arm 29.

Cam 31, as shown in Figures 3, 4, 5, and 7, is part of a constantly rotating assembly carried by shaft 40a, rotatable in suitable bearings 40b mounted in plates 34 and 34c. Shaft 40a carries an enlarged hub portion 40c, and by means of three screws 40d, and a spacer 40e, cam 31, gear 40 and cam 52 are all conveniently fixed to hub 40c and to shaft 40a.

Motor 43 and driving gear 40 are supported from plate 34c by screws 43a. Pinion 41 on motor shaft 42 meshes with gear 40, and while motor 43 runs, it continuously rotates shaft 40a and cam 31. In the present embodiment motor 43 drives shaft 40a at the relatively slow speed of 10 R. P. M. or one revolution every six seconds.

As shown in Figures 7 and 8, cam 31 is cut out at 31a to permit follower 30 periodically to move inwardly under the influence of the flexure arms 24 and 25. Thus as cam 31 rotates, when edge 31c moves under follower 30, the follower rolls into the cut out to give pen arm 7 a sharp inward movement to the chart. As cam 31 continues to rotate, lobe 31b of the cam gently moves cam-follower 30 outward. The cut out 31a is made short to make the printing operation consume only a small part of the six second cycle.

Turning now to the mechanism used to swing pen arm 7 clockwise to the pen-magazine: Driving arm 32 (also referred to as a pick-up arm) is shown in Figures 2 and 5 ready to be moved clockwise by its operating mechanism. It is so held by link 48 suitably connected to arm 32 and to rocker 49 by stud screws 48a. Rocker 49 is fixed to shaft 50 (Figure 3) suitably pivoted between plates 34 and 34c. Its cam-follower 51 is a roller rotatably mounted on a stud shaft 51a secured to the lower end of rocker 49. Roller 51 is constantly urged against cam 52 by spring 53 connected at one end to a pin 53b in plate 34, and at its other end to a pin 53a in rocker 49.

Cam 52 has four sections. Section 52a is a holding section which holds pick-up arm 32 clear of bail 22, and leaves positioning arm 20 entirely free to position the bail and pen arm. Section 52b induces a rather rapid clockwise rotation of rocker 49 to move pick-up arm 32 into contact with the bail and to swing pen arm 7 to the outer edge of the chart and to the pen magazine. Section 52c is a short holding section holding the pen holder at the pen magazine while the magazine rotates and changes pens. Section 52d moves pick-up arm 32 counter-clockwise and gently lowers bail 22 into contact with positioning arm 20.

Referring to Figure 5, the full-line position shows cam 52 and its holding surface 52a holding rocker 49 and pick-up arm 32 in their extreme counter-clockwise positions, leaving the positioning arm 20 free to position bail 22 and pen arm 7. But as cam 52 continues its counter-clockwise rotation, roller 51 rides down on cam surface 52b and eventually rocks pick-up arm 32 to its extreme clockwise position shown in dotted lines. In so doing, bail 22 and pen arm 7 swing clockwise to position pen holder 9 in the position shown in dotted lines in Figure 1, and in full lines in Figure 13, ready for rotation of the magazine.

A spring 54 (Figure 5) has an end 54a that is sprung clockwise by bail 22 as it moves to its extreme clockwise position. The spring gives bail 22 a push when pick-up arm 32 starts its retracting movement to insure bail 22 moving with arm 32. Spring 54 is held in place as shown in Figure 5 by being bent around stud shaft 33 and by locating its ends against opposite sides of a stud 54b secured in plate 34, and provided with a head 54c which keeps the ends in position. Without spring 54, or its equivalent, it may be possible for pen holder 9 to hold up at the magazine and prevent arm 7 from lowering to its recording position.

The slope of cam surface 52d is relatively gently so that when bail 22 pivots into contact with arm 20 there is no shock. Depending upon the position of arm 20, as determined by the condition-responsive mechanism, the bail will contact arm 20 sooner or later during the passage of cam surface 52d past cam-follower 51. Thus, if arm 20 is held in position to record record B at the outer edge of the chart, bail 22 will contact positioning arm 20 shortly after the cam surface 52d moves under roller 51. But if the condition-responsive member is positioning arm 20 for the record marked "B1" in Figure 1, then the bail will not contact arm 20 until surface 52d has moved roller 51 nearly to its maximum outward position.

The surface 52a of cam 52 holds pick-up arm 32 in its extreme counter-clockwise position for a considerable portion of each cycle to allow the measuring mechanism ample time to come into balance after being connected to the next succeeding measuring element, and before the printing operation takes place.

Since cam 52 and printing cam 31 rotate as a single unit, the operations of pick-up arm 32 are positively synchronized with the printing operation, and arm 32 is always out of contact with bail 22 during the printing operation.

Figure 9:
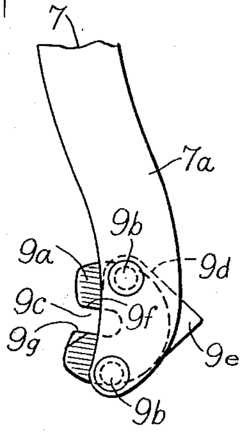
Figure 9 is an enlarged front elevation of the pen holder mounted on the pen arm.
Figure 10:
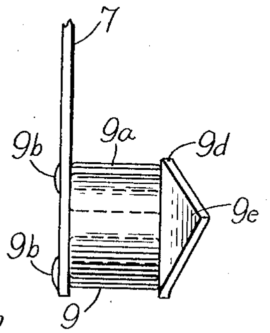
Figure 10 is a left side elevation of the pen holder of Figure 9.
Figures 13, 14:
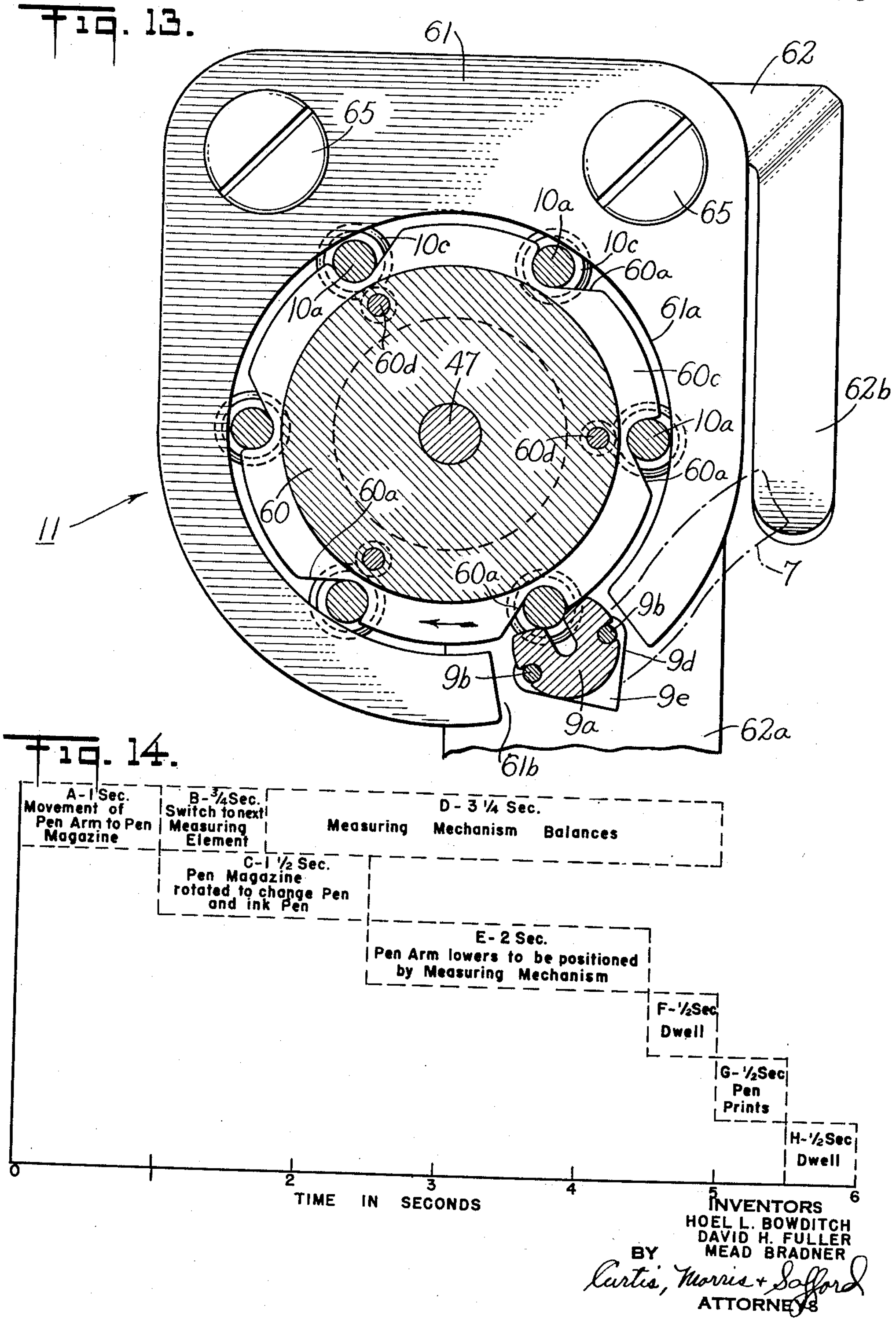
Figure 13 is a section taken on line 13—13 of Figure 11, and showing in vertical section the pen holder at the pen magazine.
Figure 14 is a diagram of the time consumed by the individual operations that take place in a complete cycle of operation.

We turn next to the construction of pen holder 9: As shown in Figures 1, 9, 10 and 13, the lower end of arm 7 is curved at 7a (Figure 9), and carries a magnet 9a secured thereto by rivets 9b. Magnet 9a is shaped, as shown in Figures 9 and 13, to provide a concentrated magnetic flux flow across the poles of the magnet, and in an area identified as 9c. The magnet is preferably of a highly magnetized material such as is sold under the trade name "Alnico No. 5" to provide a holder having a relatively strong magnetic force, but of minimum weight. The concentrated lines of magnetic force hold pen shank 10a (Figure 11) (made from the magnetizable material) tightly against the magnet.

Also attached to the under side of magnet 9a by rivets 9b is a plate 9d having a pointed extension 9e aligned with the printing tip 10e of pen 10 held by the magnet. The pointed extension is useful to indicate position of the pen tip with reference to the time arc of the chart, because when the instrument is viewed from the front, the printing point of the pen is not visible.

Figures 11, 12:
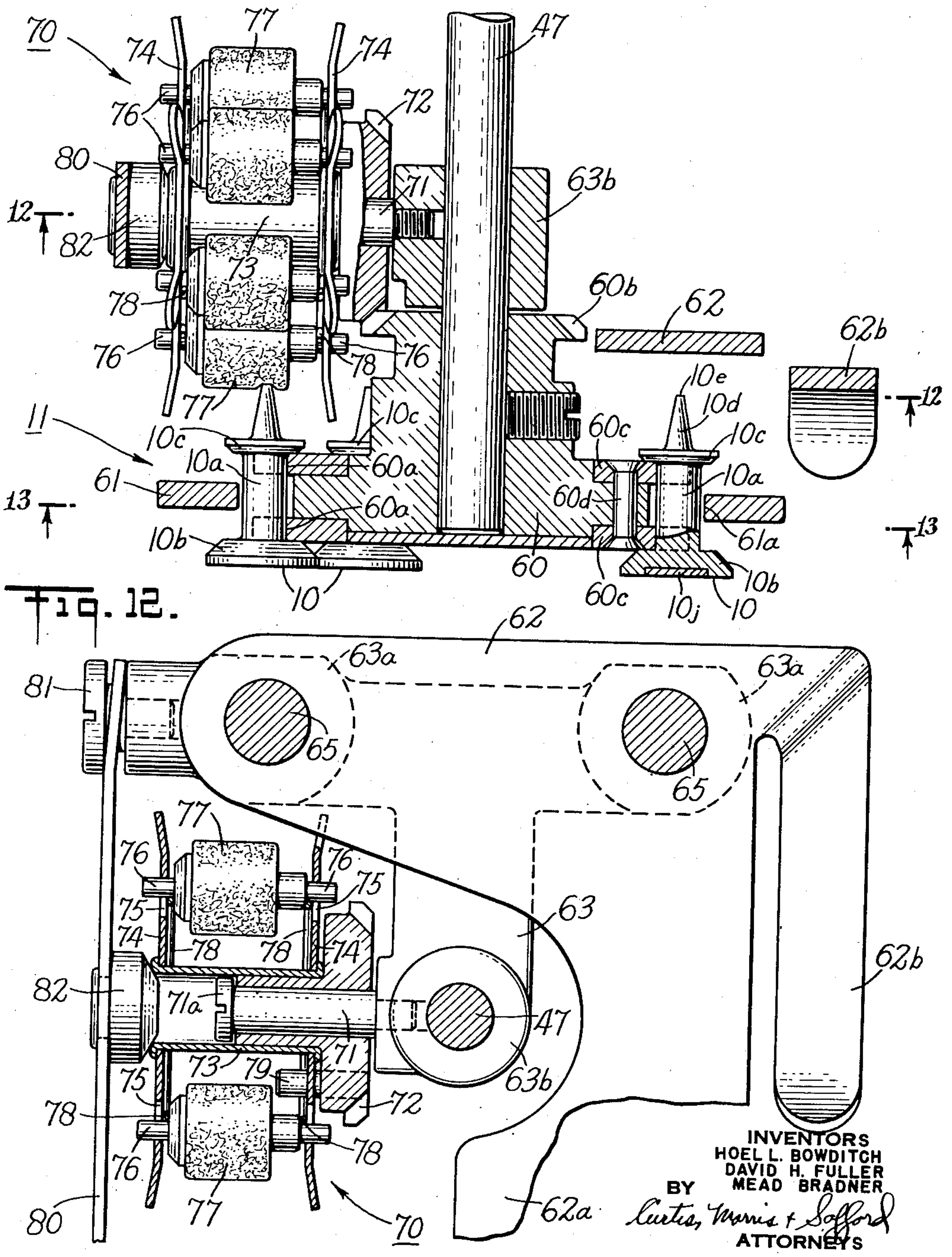
Figure 11 is a detail taken on line 11—11 of Figure 1 showing details of the pen magazine and an inking mechanism.
Figure 12 is a sectional view, taken on line 12—12 of Figure 11, showing in greater detail the construction of the inking mechanism.

Each pen, as shown in Figure 11, has shoulders 10b and 10c at the ends of shank portion 10a, and the shoulders together with the concentrated magnetic flux insure correct axial alignment of the pen. Also, shoulder 10c prevents axial movement of the pen with respect to the magnet when the pen strikes the chart. The shoulders are tapered as shown to guide each pen into correct alignment on the holder as the magazine presents a pen to the holder. It is understood that known clasp constructions may be used in place of the magnet to detachably support the pen on the holder, but the holder of this embodiment has the advantage of being light in weight, of having no moving parts, and of being positive in its action.

Figure 9A:
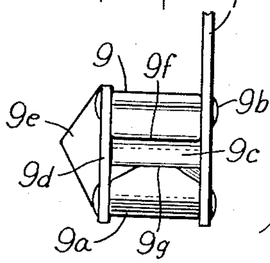
Figure 9A is a left elevation of the pen holder as shown in Figure 9.

Referring to Figure 9A, the upper inner edge of 9f of the magnet runs straight across the width of the magnet, but the lower edge 9g is cut back at its ends to remove the corners as shown. With this construction, when the holder is raised to the magazine as shown in Figure 13, and rotor 60 rotates to bring another pen to the magnet 9a, if per chance the pen has any tendency to cock or misalign itself between the two poles of the magnet, the narrow edge 9g working on the pen shank in conjunction with the wide edge 9f serves always to align the pen shank accurately on the magnet as shown in Figure 4.

Each pen 10 has a printing end 10e. The shape of the printing end, the material from which it is constructed (such as metal, wood, plastic, etc., is determined by factors such as the nature of the ink used, the character of the surface of the chart on which the pen is to print, the size and nature of the mark desired, and others.

The shape of the metal end may be flat as shown in Figure 11; or (referring to Figure 15) may be concave as shown at 10f to carry more ink; or may have a double taper as shown at 10g; or may be pointed as shown at 10h.

As shown in Figure 11, each pen may be provided with an identifying colored insert 10j to identify the color of the ink that the pen carries.

Figure 3:
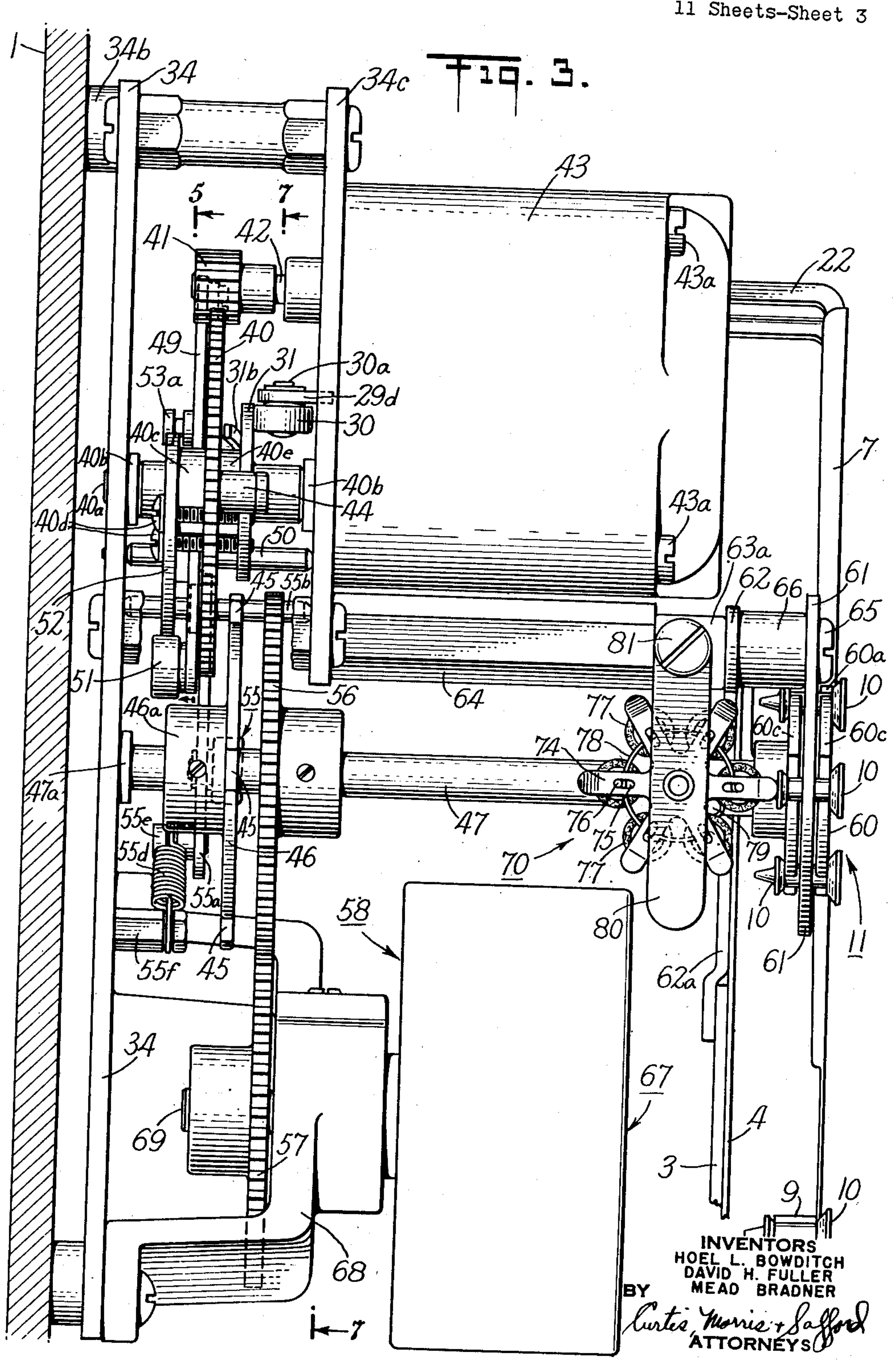
Figure 3 is an enlarged detail looking from line 3—3 of Figure 1 and showing at the right a pen magazine and inking mechanism, and at the left driving mechanism by which the pen arm and other parts of the recorder are operated.

Referring now to the pen magazine 11: Pen-holding rotor 60 (Figures 3 and 11) is surrounded by an outer ring 61 that is positioned close to the opening of the pen recesses 60a in the rotor. Ring 61 and other stationary parts of pen magazine 11 are mounted in a T-shaped casting 63 supported from two columns 64 (Figures 3 and 4) threaded into plate 34c. As shown in Figures 1, 3 and 4, screws 65 pass through ring 61, through spacer sleeves 66, through a plate 62, through arms 63a of bracket 63 (Figure 12), and thread into columns 64 to secure the parts together.

Referring to Figures 11 and 12, shaft 47 which supports and drives rotor 60 passes through arm 63b of bracket 63 which provides a bearing support for the shaft and keeps rotor 60 in radial alignment. Rotor 60 is suitably secured to shaft 47 by a set screw. The inner end of rotor 60 has a beveled gear portion 60b which, as will be described, rotates the inking mechanism.

The pen holding portion of rotor 60 carries two annular racks 60c suitably secured by rivets 60d to the rotor. Referring to Figure 13, each rack 60c has six hook-shaped holding notches 60a. The racks 60c are spaced and aligned to receive pen shanks 10a and hold them ready to transfer to pen holder 9. The racks 60c are spaced to coact with the pen shoulders 10b and 10c to axially align the pens with respect to the rotor.

Pen holding notches 60a are so shaped that when the pen holder moves a pen into a notch, as shown in Figure 13, and the rotor rotates one-sixth of a revolution, the notch engages the pen and pulls it from magnet 9a. The leading edge of each notch 60e is sloped as shown to guide the pen to the bottom of the notch and against the edge that engages the pen to pull it from the magnet. This construction eliminates need of close tolerance in manufacturing and adjustment, and need of exactly aligning magnet 9a with respect to the notches when presenting a pen thereto.

As shown in Figure 11, ring 61 is positioned with its holding edge 61a midway between racks 60c, and is radially spaced to hold the pens in notches 60a, without interfering with rotation of the rotor. The shape of the holding notches 60a and the direction of rotation of rotor 60 prevents pens rolling out on the leading edges of the notches and binding the rotor as it rotates.

Ring 61 is open at 61b to receive pen holder 9 and to permit access to rotor 60. The opening 61b is small enough to prevent a pen from dropping past holder 9 after it has been removed from the holder by rotation of rotor 60.

As previously mentioned, shaft 47 and rotor 60 are conveniently rotated in steps by notched driving wheel 40 (or equivalent mechanism) (Figure 7) which is intermittently driven by constantly revolving roller 44 (mounted on gear 40) engaging notches 45 spaced equidistant around wheel 46. Each time driving roller 44 revolves it enters and leaves a notch 45, and in so doing rotates disc 46 through one-sixth of a revolution. As the roller 44 leaves a notch, the succeeding notch is positioned to receive roller 44 on its next trip around.

As shown in Figure 3, shaft 47 is supported at its inner end in a bearing 47a in base plate 34, and wheel 46 is suitably fixed to a bushing 46a secured to shaft 47 by a set screw not shown.

To insure alignment of notches 60a with opening 61b on each one-sixth rotation of rotor 60, suitable detent mechanism 55 is provided. This mechanism shown comprises a rocker arm 55a mounted on a shaft 55b suitably journaled in bearings between plates 34 and 34c (Figure 3). Suitably mounted on arm 55 is a roller 55c, and a spring 55d urges roller 55c against the periphery of wheel 46. One end of spring 55d is anchored to a pin 55e on rocker arm 55a, and its other end is secured to a pin 55f fixed to base plate 34. The diameter of roller 55c is greater than the width of the notches, and its action in partially entering the notches performs a detent action that insures correct positioning of notches 60a of rotor 60.

Referring to Figure 1, the plate 62 has a downwardly extending finger 62a which extends under chart 4 and a finger 62b that extends over the chart to keep it flat against finger 62a, so that the chart cannot catch on the pen tip as the pen holder takes a pen from the magazine and moves it over the chart.

The tips of pens 10 in the embodiment of Figure 1, are inked by inking mechanism generally indicated by numeral 70 as shown in Figures 3, 11 and 12. In general the inking mechanism comprises a rotatable structure supporting six ink pads—one for each pen. The structure is rotated in synchronism with rotor 60, and during each complete rotation of rotor 60 each pen receives an individual inking.

Referring to Figure 12, inking mechanism 70 is supported by a stud shaft 71 threaded into the lower arm 63b of bracket 63. Shaft 71 rotatably supports a beveled gear 72 held in place on shaft 71 by a head 71a. Beveled gear 72 meshes with and is driven by beveled gear 63 of rotor 60.

Supported on an extension of gear 72 is a sleeve 73 to which are suitably secured opposed star-shaped ink pad holders 74 provided with aligned slots 75 for receiving shafts 76 on which are respectively mounted several felt cylinders 77 which respectively hold the different colored inks for inking the pens. Annular springs 78 push outwardly on shafts 76, and resiliently hold the ink pads at their extreme radial positions. A pin 79 in gear 72 engages the inner star-shaped ink pad holder 74 and drives the ink pad holder unit.

The sleeve 73 is urged inwardly against the shoulder of gear 72 by a spring arm 80 freely secured by a suitable screw 81, threaded into one of the arms 63a of bracket 63, as shown in Figure 12. Spring arm 80 carries a pushing disc 82 which pushes on sleeve 73 but does not interfere with its rotation.

The above construction rotates the inking mechanism 70 about an axis perpendicular to the rotation of rotor 60, but synchronizes the rotation of the ink pads with the rotation of the pens held in the pen magazine. Referring to Figure 11, as the pens successively pass by the plane of rotation of the ink pads, each pen engages and pushes against its respective ink pad. The annular springs 78 yield to prevent undue stress and wear, but hold the ink pads out to insure proper inking. Also the inking operation gives each ink pad a slight rotation about its shaft 76 so that it continues to ink its pen at a fresh area on the ink pad.

The ink pad holder is easily removed for replacement by flexing spring arm 80 outwardly and swinging it to one side so that a new set of ink pads on a holder may be slid into place. The new ink pad holder cannot be mis-aligned with the pens of the rotor because the driving pins 79 and the ink pad holder are so constructed that they can inter-engage in only one condition of alignement.

When the recorder is used as a single record recorder, each of the six ink pads has the same color ink. If it is used as a two-record recorder, every other ink pad will have the same color; as a three-record recorder, every third pad will have the same ink. When used as a four-record recorder, four of the pads will have different colors and the two remaining pads will have colors corresponding to two of the first four pads. With this arrangement, the pen will print two of the records more frequently than the other two records. The same condition applies when it is used for making five records, in which event one of the five records will be printed more frequently than the other four.

But another advantage of the invention is that other sequence combinations than those above described may be used. Thus, by merely arranging the ink pads and arranging the switching mechanism to connect the measuring elements in a sequence to match the ink pad arrangement, different recording sequences may be set up.

It is also contemplated that instead of having pens 10 such as shown, each pen may contain its own ink reservoir. The construction may be like that of the usual ball tip pen, or of any other convenient construction designed to provide a pen that may print a large number of times without replenishing of its ink supply. When reservoir pens of this type are used, there is, of course, no need for the inking mechanism 70.

As above pointed out, suitable mechanism is provided to switch the condition-measuring mechanism from one measuring element to another after each printing operation and while the pen arm is at magazine 11. The measuring elements may be, for example, thermocouples, pH cells, resistance bulbs, or other types of elements having an electrical characteristic that changes in accordance with change of the condition being measured. Referring to Figure 3, switching mechanism generally indicated at 67 is provided. The switching mechanism may be of the type disclosed in Cobbett United States Patent 2,184,611, issued December 26, 1939. It is supported on a bracket 68 secured to base plate 34, and has a shaft 69 extending rearwardly that carries a gear 57 which meshes with a gear 56 suitably fixed to shaft 47. As shaft 47 is periodically rotated in steps, gear 57 similarly rotates shaft 69. The detent action on driving wheel 46 serves properly to align the switching mechanism in its six stages to insure proper connection of each successive measuring element with the condition-measuring apparatus of the recorder.

The positive mechanical interconnection between the operation of the switching mechanism, the rotor 60, and the inking mechanism, insures pen holder 9 always printing with the colored pen that corresponds to the measuring element connected to the measuring mechanism.

Referring to Figure 14, a time chart for a cycle of operation of the mechanism of the Figure 1 embodiment is shown. The base of the chart shows in seconds time consumed for a complete cycle and the time allotted to each operation. The operation, represented by sections designated A through H, may be described as follows:

Section A, one second; in this operation cam surface 52b (Figure 5) swings pen arm 7 to the pen magazine.

Section B, three fourths of a second; in this operation switching mechanism 67 rotates to disconnect the measuring element whose record has just been recorded and connects the next succeeding measuring element to the condition-measuring mechanism. The beginning of operation B is synchronized with the completion of operation A.

Section C, one and one-half seconds; in this operation rotor 60 moves through one-sixth of a revolution to change and ink the pens. Its beginning is synchronized with the completion of operation A.

Section D, three and one-quarter seconds; in this operation the condition-measuring mechanism balances after being switched to the next measuring element. The balancing starts immediately with the completion of switching operation B, and has ample time to insure complete stabilization of the measuring mechanism before printing.

Section E, two seconds; in this operation cam surface 52d lowers the pen arm for positioning by the condition-measuring mechanism. The operation commences immediately with the termination of pen changing operation C, but terminates one-half second before the printing operation so that its operation cannot interfere with the positioning of pen arm 7 during the printing operation.

Section F, one-half second; this is a dwell provided after operation E, and before printing operation C to insure accurate location of the parts for printing.

Section G, one-half second; this operation moves the pen into and out of contact with the chart.

Section H, one-half second; this is another dwell, which with dwell F is allowed for manufacturing tolerances.

As above pointed out, the electrically operated measuring mechanism may be of any known type, for example, such as that shown in the patent application of Wilfred H. Howe and Robert W. Cushman, Serial No. 637,733, filed December 28, 1945, now Patent No. 2,630,008. The switching mechanism preferably is so adjusted that as the switch rotates it disconnects the measuring mechanism from the element last measured and only momentarily leaves the measuring mechanism unconnected before reconnecting it with the next measuring element. With such operation there is only a slight quiver of arm 17 and positioning arm 20, as the switching operation takes place, and maximum time is allowed for the balancing operation of the measuring apparatus.

The measuring apparatus itself is preferably constructed always to come to balance within the three and one-half seconds or less after being switched to a measuring element. Of course, if measuring apparatus having slower balancing time is required, the six second cycle may be increased by slowing down the overall operation, as by slowing the speed of motor 43.

There are, however, advantages in having a rapid printing cycle. The above-mentioned six-second printing cycle is much faster than the printing cycles of conventional multi-record recorders, and makes it possible to use radial displacement of adjacent dots printed by the recorder to measure the rate of change of a condition being measured. Such is not practical when much slower printing cycles are used in producing as many as six records. If measuring mechanism having a still faster balancing time than three and one-half seconds (i. e., one that, for example, can cause the pen arm to transverse the chart in two seconds) is used, the six-second printing cycle may be reduced in proportion to the reduction in balancing time.

Figure 16:
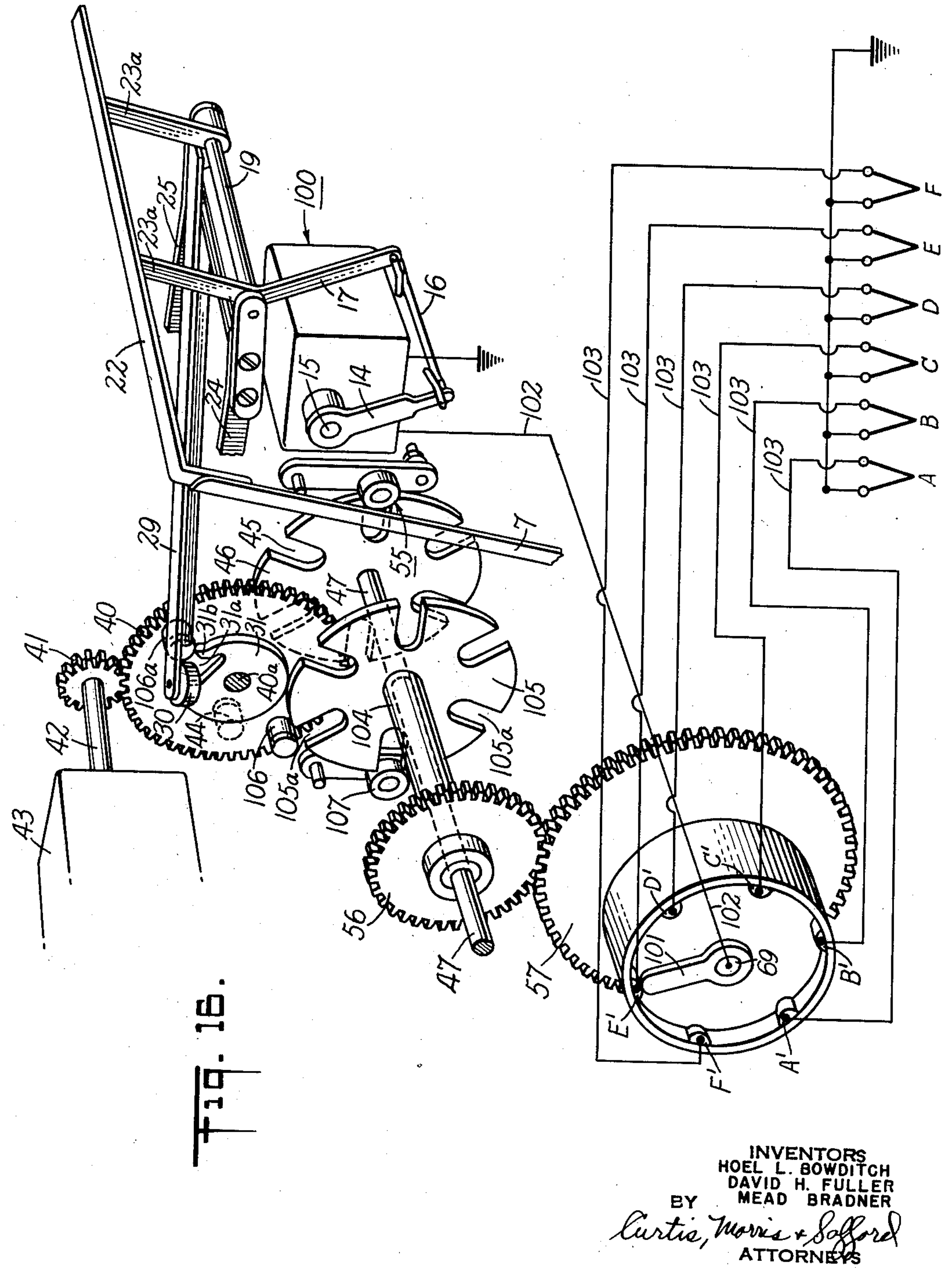
Figure 16 shows diagrammatically a circuit that may be used with another embodiment of the invention, and in which the measuring mechanism itself drives the pen to the edge of the chart for pen exchange.

In the Figure 2 embodiment pen arm 7 is swung to the pen magazine by the constantly driven cam and independently of the measuring mechanism. In Figure 16 there is diagrammatically shown another embodiment in which the measuring mechanism itself not only positions the pen arm for recording, but also is the drive that moves the pen arm to and from the pen magazine.

The measuring mechanism is generally indicated by the box 100, and includes the circuits and balancing motor such as is shown disclosed in the above-mentioned United States Howe et al. patent application. The arm 14 positioned by the measuring mechanism is connected as before by link 16 to lever 17, which is adjustably but permanently connected to the outer arm 23a supporting bail 22 mounted on flexures 24 and 25 as in the Figure 2 embodiment.

When measuring mechanism 100 is electrically connected to any one of the measuring elements A, B, C, D, E, or F, its arm 14 positions bail 22 and pen arm 7 for recording. As before, the recording or printing operation is performed by the printing lever 29 operated by constantly rotating cam 31 secured to constantly driven gear 40.

But when the measuring mechanism 100 is not connected to one of the measuring elements, its circuit is so arranged, in known manner, that it drives arm 14 clockwise to swing pen arm 7 clockwise to present pen holder 9 to the magazine. Measuring mechanism holds pen holder 9 at the magazine as long as it is not connected to a measuring element.

In the Figure 2 embodiment when the switching mechanism 67 is rotated, it only momentarily disconnects the measuring mechanism from the measuring element. But in the Figure 16 embodiment this is not so. The switching mechanism is operated in two steps for each cycle. One step disconnects the measuring element after the printing operation. The other step connects the mechanism with the next measuring element. To this end, and as diagrammatically shown in Figure 16, a rotating contact 101 is successively moved into contact with the six stationary contacts A', B', C', etc., to connect the measuring mechanism through line 102, successively with the measuring elements A, B, C, etc. through their respective lines 103. Also the switching mechanism is so driven that contactor 101 is moved to and stopped at positions between the stationary contacts. It is while contactor 101 is held between two stationary contacts that mechanism 100 drives arm 7 to the pen magazine for the pen change.

To carry out the above operations in each complete measuring and printing cycle, switching mechanism 67 is moved two times, and each movement may be one-twelfth of a revolution. To this end, gear 57, that drives contactor 101, meshes with a gear 56 in a 2:1 reduction. Gear 56 is mounted on a sleeve 104 freely rotatable on shaft 47, and is driven by notched wheel 105 having six notches 105a. Two oppositely disposed pins or rollers 106 and 106a are mounted on constantly rotating gear 40, and are positioned to enter notches 105a and to rotate wheel 105 one-sixth of a revolution each time one of the pins enters a notch. Thus, for each complete revolution of gear 40, and so for each complete recording and printing cycle, wheel 105 is rotated in two steps, each step being one-sixth of a revolution. This step rotation, through the 2:1 reduction between gear 56 and gear 57, acts first to move contactor 101 from one of the stationary contacts to a position between two contacts, and then to move contactor 101 to the next stationary contact.

As in the Figure 2 embodiment, rotor 60 and the inking mechanism are driven from shaft 47, which is rotated one-sixth of a revolution each time roller 44 carried by gear 40 enters and leaves a notch on wheel 46. Each drive wheel 46 and 105 has its respective detent mechanism that serves correctly to position the drive wheels while they are not being rotated.

Leading pin 106 on gear 40 is so positioned with respect to printing cam 31 (fixed to gear 40) that the moment the printing operation is completed, i. e., the moment roller 30 rolls onto lip 31b, pin 106 enters a notch 105a, turns drive wheel 165 one-sixth of a revolution, and contactor 101 one-twelfth of a revolution, to disconnect measuring mechanism 100 from the measuring element whose value has just been recorded. Measuring mechanism 100 then swings pen arm 7 to the pen magazine as previously described. Roller 44 is so positioned on gear 40 with respect to roller 106 that after an interval sufficiently long for the measuring mechanism to move pen arm 7 to the pen magazine, roller 44 enters a notch in wheel 46 and turns it one-sixth of a revolution to perform the pen-changing operation.

Roller 106*a* is so positioned on gear 40 with respect to roller 44 that as roller 44 leaves wheel 46, roller 106*a* immediately enters a notch 105*a* in wheel 105, and turns it one-sixth of a revolution to move contactor 101 one-twelfth of a revolution and into contact with the next succeeding stationary contact. This operation connects measuring mechanism 100 with the next measuring element, and mechanism 100 moves pen arm 7 to a recording position corresponding to the condition of the measuring element.

Cam 31 is so positioned with respect to roller 106*a* that its cut out 31*a* does not move under cam-follower 30 until the measuring mechanism 100 has had ample time to come to balance to position pen arm 7 for the printing operation.

Whereas this embodiment has the advantage of fewer parts than that of the figure 2 embodiment, it may require a longer printing cycle, because measuring mechanism 100 is required to move the pen arm to the magazine and to hold it there during the exchange of pens. Thus the proportion of each printing cycle available for the measuring mechanism to come to balance after it is connected to the next succeeding measuring element is less than in the Figure 2 embodiment, and results in a longer cycle for each recording operation. The Figure 2 embodiment is faster because the drive mechanism that moves the pen arm to and from the pen magazine is independent of the measuring mechanism, and so the switching operation to connect the measuring mechanism to the next succeeding measuring element may take place the moment the pen arm reaches the magazine. It does not have to wait until the pen change has been accomplished. Also, the pen arm is readily moved to the pen magazine more rapidly by an independent mechanical drive than can be accomplished by an electrically operated measuring mechanism.

The printing cycle of the Figure 2 embodiment may be made even faster by employing a drive, separate from that driving the rotor 60 of the pen magazine, to operate the switching mechanism in Figure 2, i. e., one that switches the measuring mechanism to the next measuring element immediately after the printing operation takes place. This construction starts the balancing time of the measuring mechanism immediately after the printing operation, and saves the time taken in section A of Figure 14 to move the pen arm to the magazine.

Figure 17:
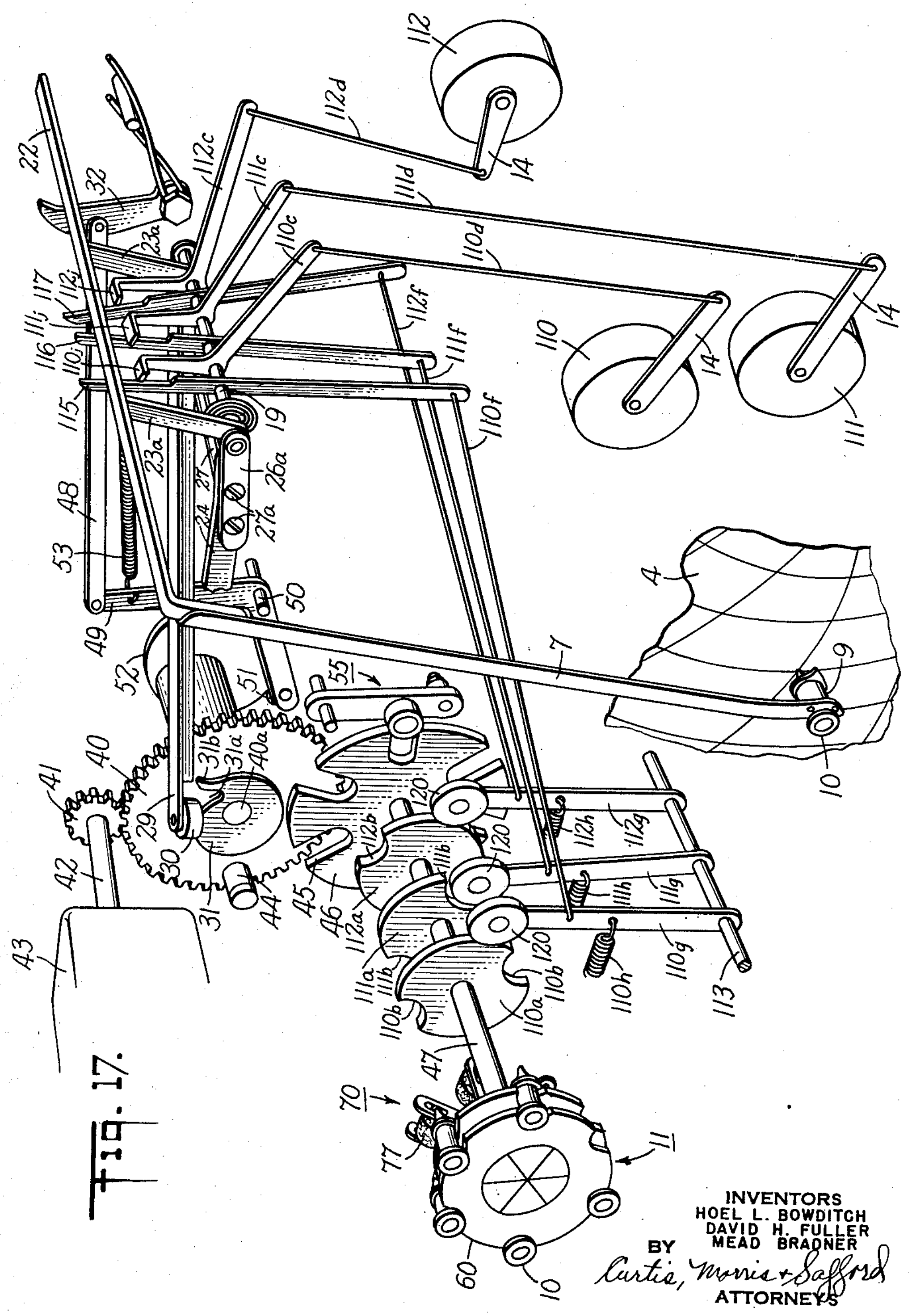
Figure 17 shows diagrammatically another embodiment of the invention, and in which mechanically-operating condition-responsive devices are used.

Turning now to the embodiment diagrammatically shown in Figure 17: in this embodiment, instead of using a single measuring mechanism which is periodically switched from one measuring element to another, a plurality of measuring mechanisms is used, each continuously connected to its measuring element and each continuously positioning a positioning lever in accordance with the behavior of the condition being measured. Selecting mechanism is provided by which the bail 22 moving pen arm 7 is successively positioned by the several measuring mechanisms. This construction is advantageously used where measuring elements are employed which, by nature of their construction, cannot be successively connected to a single measuring mechanism. It is also useful in those instances in which the measuring mechanism and the measuring element with which it is associated by the very nature of its construction cannot come into balance rapidly after the measuring mechanism is connected to the measuring element. This problem exists in apparatus used for measuring the pH values of solutions.

In Figure 17, bail 22 moving pen arm 7 is successively positioned by the three mechanical measuring elements 110, 111, and 112, each of which has a movable arm 14. The mechanical measuring mechanisms may be of any type such as, for example, Bourdon tubes, hollow spiral or helical tubes, bellows, floats, etc., or the measuring mechanism 110, 111, 112 may be electrically or pneumatically operated.

The arms 14 of the measuring mechanisms shown are respectively connected by links 110*d*, 111*d* and 112*d* to positioning levers 110*c*, 111*c* and 112*c*, each freely pivoted on shaft 19 carried by flexures 24 and 25 similar to those of Figure 2. The levers 110*c*, 111*c* and 112*c* are at all times positioned by their respective measuring mechanisms in accordance with the values of the conditions they are measuring. Fixed to and extending laterally from each lever 110*c*, 111*c* and 112*c* is a positioning part 110*j*, 111*j* and 112*j*.

Respectively associated with the levers are bail contacting arms 115, 116 and 117, each freely pivoted on shaft 19 and constructed to contact and be positioned by their associated levers 110*c*, 111*c* and 112*c*. The bail contacting arms extend downwardly and are respectively connected through links 110*f*, 111*f* and 112*f* to selectors 110*g*, 111*g* and 112*g*. The selectors are freely pivoted about stationary shaft 113, and when a selector is moved to its clockwise position (as are selectors 110*g*, 112*g*, Figure 17), it holds its respective bail contacting arm out of contact with its positioning lever and out of contact with the bail 22.

But when one of the selectors is moved to its counter-clockwise position (as has been the selector 111*g*, Figure 17), under the urge of light springs 110*h*, 111*h* and 112*h*, then the bail contacting arm connected to that selector is moved by the spring into positioning contact with the positioning part of its lever (110*c*, 111*c* or 112*c*), and it assumes a position corresponding to that of the measuring mechanism positioning the lever. Since the positioning arms 115, 116 and 117 extend above bail 22, and since only one of the selectors is released at a time to permit its positioning arm to contact its bail 22, the pen arm 7 is positioned by the measuring element whose selector is free.

To this end each selector carries a roller 120 that cooperates with associated discs 110*a*, 111*a* and 112*a*, fixed to and rotated by shaft 47. Each disc has two opposed concave notches into which the follower of its associated selector may ride. When a notch moves into position under a follower 120, its selector pivots counter-clockwise under the influence of its spring to move its associated bail contacting arm into contact with its associated positioning lever, so that bail 22 may be positioned by the measuring mechanism associated with that selector.

Figure 17 illustrates measuring mechanism 111 positioning pen arm 7. The bail 22 is shown in contact with the bail positioning member 116 as positioned by lever 111c, and the recorder is ready to print on the chart the recording position of pen arm 7. The printing operation is carried out in the same manner as described in connection with the Figure 2 embodiment.

After the printing operation constantly rotating cam 52 (similar to that of Figure 2) moves pick-up arm 32 clockwise, swings pen arm 7 to the magazine, where the magazine is rotated one-sixth of a revolution by pin 44 engaging in notch 45 of drive wheel 46. The discs 110a, 111a and 112a fixed to shaft 47, driven by drive wheel 46, are so arranged that each one-sixth revolution of shaft 47 releases a single selector. The releasing is progressive in an orderly sequence. In this way, for example, pen arm 7 may successively record in repeating sequence the positions of measuring mechanism 110, 111 and 112.

As described in connection with Figure 2, the pens 10 carried by the magazine may be arranged to print in three different colors—a color for each measuring mechanism.

Whereas three measuring mechanisms are shown in Figure 17, the invention is useful for recording the values of one, two, three, four, or as many measuring mechanisms as may be desirable or practical.

As above mentioned, an advantage of the construction of this embodiment is that the measuring mechanisms are at all times holding their respective positioning levers in recording position, and after the conditioning operation that takes place at the edge of the chart which changes the color carried by the pen arm, the bail 22 may be rapidly returned to a positioning lever and the printing operation may be caused to take place immediately because no time is required for a measuring mechanism to come to balance.

Figures 18, 19, 20:
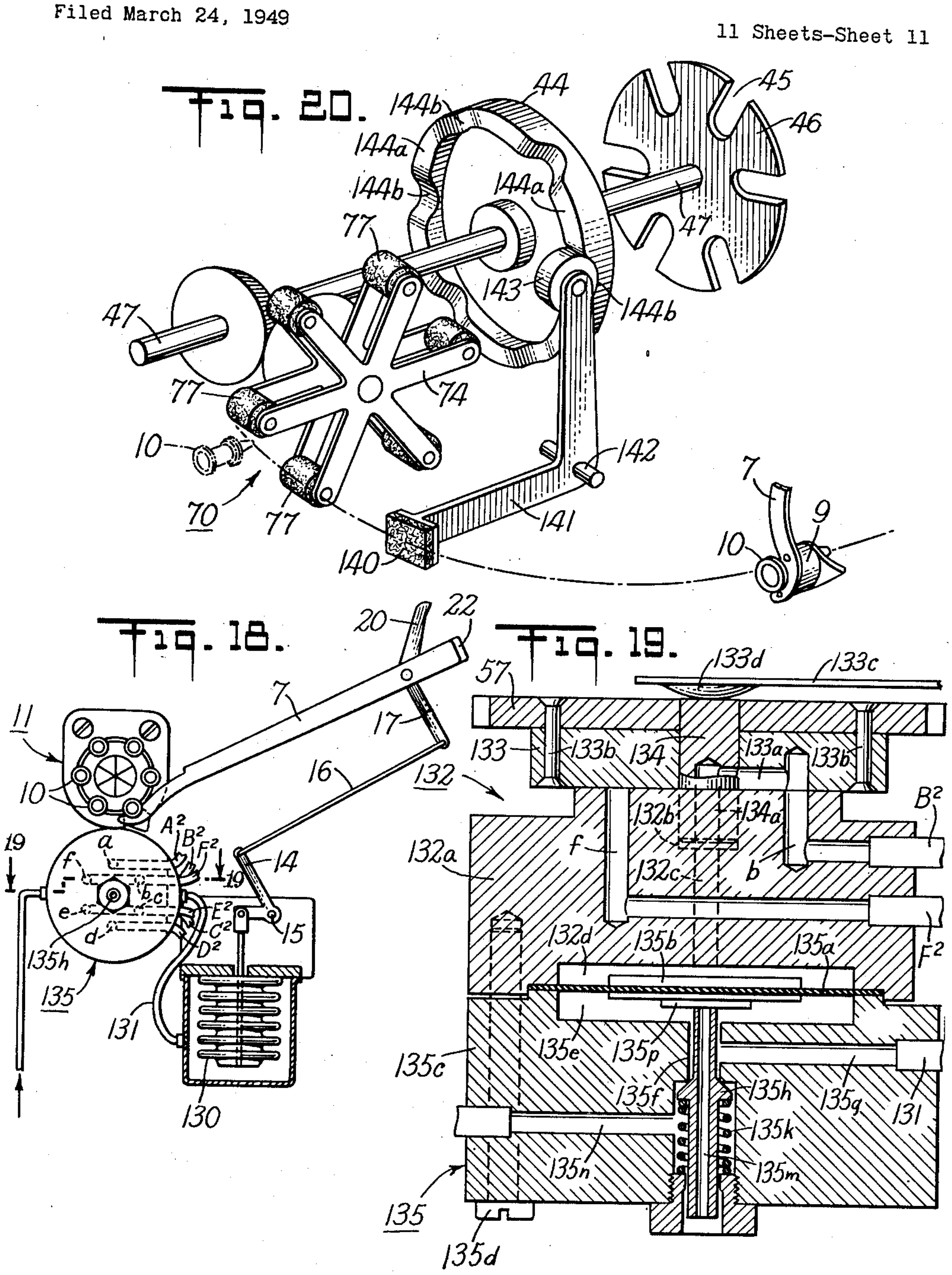
Figure 18 shows diagrammatically still another embodiment of the invention, and discloses pneumatically operated measuring mechanism, and a switch for switching it in succession from one to another of six pipes containing air under pressure from pneumatic transmitters.
Figure 19 is a section taken on line 19—19 of Figure 18.
Figure 20 shows diagrammatically another embodiment of the invention, and in which the pen characteristic is changed at the chart edge without changing the pen itself.

Referring now to Figures 18 and 19, there is shown diagrammatically an air-operated measuring mechanism which, through suitable switching mechanism, is connected successively to six separate air pressures being transmitted to the recorder. The air pressures thus received may be transmitted from conventional pressure transmitters respectively responsive to any kind of process condition to be recorded.

The recording mechanism may be identical to that shown in the Figure 2 embodiment. The positioning arm 20 and bail 22 are shown positioned by lever 17, link 16 and arm 14. It is arm 14 that is positioned by a suitable air-operated measuring mechanism 130, illustrated as being a pressure-responsive bellows such as disclosed in United States patent application, Serial No. 51,601, filed September 28, 1948, now Patent No. 2,623,392. The measuring mechanism 130 is connected by a pipe 131 to a switching mechanism, generally indicated at 132, which is periodically operated by gear wheel 56 (Figure 2) each time shaft 47 is turned one-sixth of a revolution to connect the measuring mechanism with a different pressure transmitter.

Pipes $A^2$, $B^2$, $C^2$, etc. are suitably connected to a connecting block (not shown) into which block are connected pipes from six different pressure transmitters, or other devices having output pressures. The pressures from such transmitters are continuously supplied to the pipes $A^2$, $B^2$, $C^2$, etc., and switching mechanism 132 operates to connect successively the pressures in the pipes to the pipe 131 of measuring mechanism 130. In this way, mechanism 130 successively positions positioning arm 20, bail 22 and pen arm 7 in accordance with the pressures in the pipes. The switching operation takes place as described in connection with Figure 2.

Although the switching mechanism 132 may be of any suitable structure, the one shown has the advantage of requiring only a small amount of power to move it, and of using only a small amount of air from the pressure transmitters so that the measuring mechanism balances rapidly after each switching operation.

Referring to Figures 18 and 19, pipes $A^2$, $B^2$ etc. are connected through suitable ports respectively to stations *a*, *b*, *c*, *d*, etc. in a block 132*a*. The stations open onto the polished rear surface of block 132*a*. In Figure 19, stations *f* and *b* and their corresponding passages are shown in cross section. Held against the polished surface in a disc 133 which may be made of any suitable material such as neoprene, which has a low friction characteristic with respect to the surface of the block. Disc 133 has a passage 133*a* which connects with an axial passage 134*a* of a stud shaft 134 fixed to a gear 57. The passage 133*a* is so made that as disc 133 is rotated in steps of one-sixth of a revolution each, passage 133*a* is successively aligned with stations *a*, *b*, *c*, etc. Figure 19 shows passage 133*a* aligned with station *b* and the pressure in the pipe $B^2$ is being conducted to the passage 134*a*.

Axial passage 134*a* extends forwardly to a suitable relay valve generally indicated at 135, and the output of the relay valve is connected with pipe 131 that goes to the measuring mechanism 130, as will be described.

Disc 133 is held in proper alignment with respect to the axis of block 132*a* by the stud shaft 134 which is suitably rotatably received by a hole 132*b* in block 132*a*. Gear 57 fixed to the rear end of shaft 134 meshes with and is turned by gear 56 (Figure 2). The neoprene disc 133 is secured by suitable rivets 133*b* to gear 57. A spring 133*c* having a spherically-shaped portion 133*d* resiliently presses against shaft 134, and holds disc 133 against block 132*a* to make a pneumatically tight connection between the various stations and passage 133*a*, but at the same time permits relatively free rotation between disc 133 and block 132*a*.

Passage 134*a* connects with an axial passage 132*c* in the block which extends to a chamber 132*d* closed on its outer side by flexible diaphragm 135*a*, carrying a suitable plate 135*b* which renders the central portion of the diaphragm rigid. Diaphragm 135*a* is clamped between block 132*a* and a block 135*c* by suitable screws 135*d*, one of which is shown in Figure 19. The other side of diaphragm 135*a* forms the rearward wall of a chamber 135*e* connected by a passage 135*f* to passage 135*g* which connects with pipe 131. Mounted in passage 135*f* for free axial movement is a valve body 135*h* urged inwardly by a suitable spring 135*k*, and having a passage 135*m* which connects with the atmosphere. Air at a suitable pressure (always higher than the maximum pressure in any pipe $A^2$, $B^2$, etc.) from a suitable source of supply is connected with a passage 135*n* that connects with passage 135*f*. Valve body 135*h* is operable to permit air from passage 136*n* to enter passage 135*f* or to close off this air connection. The lower end of valve body 135*h* is adapted to seat on a plate 135*p* carried by diaphragm 135a, and when it is so seated, closes off passage 135m from chamber 135e.

The action of the relay valve is as follows: Each time disc 133 rotates one-sixth of a revolution, its passage 133a is brought into registration with one of the stations a, b, c, etc., and the air pressure from that station is immediately transmitted to the chamber 132d and the pressure in the chamber 132d immediately becomes that in the pipe supplying the station. If the pressure in chamber 132d is greater than that in chamber 135e, diaphragm 132d moves forwardly and pushes valve body 135h from its seat to permit air from passage 135n to enter chamber 135e to increase the pressure in chamber 135e, until it matches the pressure in chamber 132d, at which time diaphragm 135a moves back and valve body 135h seats to close off the air supply. The pressure in the chamber 135e thus is made exactly equal to the pressure in the chamber 132d, and this pressure is transmitted through passage 135g and pipe 131 to the measuring mechanism 130; whereupon the measuring mechanism moves arm 14 to a position corresponding to the received pressure, and positions positioning arm 20 for the next recording operation.

If when disc 133 is rotated to bring its passage 133a to a new station, the pressure in chamber 132d is less than the pressure in chamber 135e, diaphragm 135a is moved rearwardly; whereupon plate 135p leaves the end of valve body 135h and connects its passage 135m with chamber 135e, and permits air in chamber 135e to exhaust to atmosphere until the pressure in chamber 135e reduces to equal that of the pressure in chamber 132d, at which point plate 135p again contacts valve body 135h and closes passage 135m.

The foregoing actions are rapid and accurate so that almost instantly after disc 133 is moved to a new station the pressure in pipe 131 is made equal to that in the corresponding pipe $A^2$, $B^2$, etc.

The volume of passages 133a and 132c and of chamber 132d is kept small so that as disc 133 is moved from one station to another the pressure at each succeeding station is, for practical purposes, unaffected by the pressure that existed in passages 133a and 132c and in chamber 132d during the time that disc 133 was at its last station.

The use of the neoprene disc 133 resiliently held against block 132a has, among others, the advantage of requiring no lubrication between the moving parts, and of providing an excellent seal so that the pressures at the various stations cannot affect one another.

Referring to Figure 18, the bellows of the measuring mechanism 130 contracts as the pressure on the outside of it is increased, and expands as the pressure is decreased, and this expansion and contraction is transmitted through a suitable rod and linkage to the lever 14.

Referring now to Figure 20, there is diagrammatically shown another embodiment in which pen 10 is fixed to pen arm 7, i. e., is not removable from it. Pen arm 7 is swung to the edge of the chart after each printing operation, and at the edge of the chart is first wiped to remove any ink remaining after the printing operation, and is then inked for the next printing operation. The mechanism for causing pen 10 to print, and for moving pen arm 7 to the edge of the chart, and for returning it to recording and printing position may be such as those described in the Figures 2, 16 or 17 embodiments.

As the pen arm 7 is swung to the edge of the chart by the cam 52 (Figure 2), it contacts and passes over a wiping pen 140 to a position in line with, but between, inking pads 77 carried by inking mechanism similar to that that supports the pads in the Figure 2 embodiment. While the pen is held at its position in line with the inking pads, the inking mechanism is rotated through one-sixth of a revolution, which causes one of the pads to pass by and ink the pen 10. Then, and while the inking mechanism is still moving, pen arm 7 is returned to its recording position, but while it is being returned, wiping pad 140 is retracted out of the path of the freshly inked pen.

The mechanism for performing these operations will now be described. Wiping pad 140 is carried on a rocker 141 pivoted on a shaft 142. Rocker 141 carries a follower 143 which rolls on a drum cam 144 secured to shaft 140. Cam 144 has six lobes 144a and six valleys 144b between the lobes. When follower 143 is in a valley, rocker 141 holds pad 140 in the path of pen 10. But when the follower 143 moves out onto a lobe, rocker 141 retracts pad 140 out of the path of pen 10.

For each one-sixth rotation of shaft 47, the inking mechanism is suitably rotated one-sixth of a revolution and cam 144 is rotated one-sixth of a revolution. While wheel 46 is stationary and the printing operation is taking place, cam 144 is positioned on shaft 47 so that follower 143 is in a valley and pad 140 is held in position to wipe pen 10. After the printing operation, cam 52 (Figure 2) moves pen arm 7 clockwise to the edge of the chart and pen 10 contacts and passes over pad 140, and cam 52 continues to hold the pen arm at the inking mechanism for the inking operation. During the time cam 52 is moving pen arm 7 to the inking mechanism, shaft 47 is stationary.

The inking mechanism is so positioned on its shaft in relation to the stationary positions of shaft 47 that the moment pin 44 on gear 40 starts to turn, an ink pad immediately contacts and inks the pen. Meanwhile, cam 144 rotates and follower 143 moves out onto a lobe 144a to retract pad 140 from the path of the pen. Immediately thereafter, and while follower 143 is still on lobe 144a, cam 52 operates to lower pen arm 7, and pen 10 moves past the pad 140, but does not contact it.

Although in the several embodiments provision is made for recording six different variables, it is to be understood that multiple record recorders embodying the invention may be manufactured for recording a larger number of variables than six. To this end, referring to the Figure 2 embodiment, the pen magazine could be provided with more than six pens and the switching mechanism provided with more than six stations. The number of pens and switch stations is limited only by practical manufacturing considerations. As the number of pens is increased, it is evident that the notches in drive wheel 46 would be increased accordingly. It is also understood that other types of mechanism to obtain the intermittent uni-directional drive of shaft 47 may be used in place of the mechanism disclosed.

With reference to the nature of the marking device carried by pen arm 7, it is to be understood that in place of color identification other known mechanisms for producing identifying marks may be used and such marking mechanism may be conditioned for each printing operation while the pen arm is held to one side of the chart.

Further, although in each of the embodiments the mechanism disclosed utilizes periodically operating mechanism, known mechanism may be used, expecially in conjunction with the Figure 16 embodiment, that would automatically start and stop motor 43. In such construction the added known type of mechanism automatically starts motor 43 as soon as the measuring mechanism comes into balance after being connected to a measuring element, whereupon motor 43 rotates to cause the printing operation to take place, to operate to disconnect the measuring mechanism from the measuring element whose value has just been recorded, and the motor then automatically stops after the conditioning of the marking device is carried out and after the measuring mechanism has been connected to the next measuring element.

From the foregoing it is evident that the invention provides remarkably simplified mechanism for carrying out in a single instrument the multiple recording of a number of conditions. It is also evident that the invention provides a novel and useful way of making multiple records whether one or more measuring mechanisms are used, and whether the measuring mechanism be electrically, pneumatically or mechanically operated. The provision of the changing of the color identification of marking mechanism carried at the end of a pen arm while the pen is at one side of the chart makes the invention useful for recording on round or strip charts and leaves the chart record completely visible.

Since many embodiments might be made of the present invention and since many changes might be made in the embodiment disclosed herein, it is to be understood that the foregoing description is to be interpreted as illustrative only and not in a limiting sense.

We claim:

1. In an industrial multi-record recorder the combination of a recording member successively positioned over a chart to recording positions corresponding respectively with the values of variable conditions whose behaviors are to be recorded, marking means carried by said recording member constructed to apply color intermittently to said chart to mark thereon the successive recording positions of said recording member, color changing mechanism mounted in a fixed location spaced from said chart and cooperatively associated with said marking means to change its marking color for each marking operation to identify each mark with its corresponding variable condition, a drive operative after each marking operation to move said recording member and marking means as a unit from one of its recording positions to said color changing mechanism for the color changing operation and thereafter to return the recording member and marking means to another recording position for the next marking operation, and operating means associated with said marking means and operative to actuate it to mark said chart.

2. In an industrial multi-record recorder the combination of a recording member successively positioned over a chart to recording positions corresponding with the values of variable conditions whose behaviors are to be recorded, a holder on said recording member constructed to removably hold a marking device, operating means associated with such marking device and operative to actuate it to mark intermittently on said chart to successive recording positions of said recording member, a magazine holding a plurality of marking devices and operative to change the marking device carried by said holder after each marking operation to identify each mark with its corresponding variable condition, a drive operative after each marking operation to move said recording member and holder from recording position to said magazine for the changing operation and thereafter to return the recording member and holder to recording position for the next marking operation.

3. A recorder of the construction set forth in claim 2 and in which said holder includes magnet means, and each marking device includes a magnetizable portion constructed to be attracted to and held by said magnet means for the marking operation.

4. A recorder of the construction set forth in claim 2 and in which said holder and marking devices are constructed and arranged to utilize magnetic flux to maintain a marking device in position in said holder.

5. In an industrial multi-record recorder, the combination of, a recording member successively positioned over a chart to recording positions corresponding to the values of variable conditions whose behaviors are to be recorded, magnetized holding means on said recording member holding a marking device by magnetic force, operating means associated with such marking device and operative to actuate it to mark intermittently on said chart the successive recording positions of said recording member, a magazine holding a plurality of marking devices and having a device changing position, and operative when said holding means is at the changing position to remove the marking device carried by the holding means and to present another marking device thereto, thereby for each marking operation to provide said holding means with a marking device characteristic of the variable condition whose value is being marked, a drive operative after each marking operation to move said recording member and holding means from recording position to said device changing position for the changing operation and thereafter to return the recording member and holding means to recording position for the next marking operation.

6. A recorder of the construction set forth in claim 5 in which said magazine includes a rotor constructed to hold a plurality of marking devices spaced equidistant therearound, and indexing mechanism operated in synchronism with said drive, indexing said rotor when said holding means is at the changing position thereby to remove the marking device presented by said holding means and to move another marking device thereto.

7. In a recording mechanism, in combination, a recording arm movable over a chart to recording positions corresponding with the values of a variable to be recorded, a marking device carried by said arm constructed to mark intermittently on said chart the recording positions of said arm, a magazine holding a plurality of marking devices, a drive mechanically moving said recording arm after each marking operation to a position adjacent an edge of said chart and thereafter returning it to recording position, and changing mechanism operative when said arm is at said edge to change the marking device carried by said arm for one from said magazine, and operating mechanism operative after the recording arm is returned to recording position to cause the marking device to mark the recording position on the chart.

8. A recorder of the construction set forth in claim 1 and in which the marking means comprises a printing member, and said color-changing mechanism includes a wiper constructed to remove color from the printing member, a plurality of devices selectively operative to supply color to the printing member and mechanism for moving said devices successively into color supplying position.

9. In an industrial recorder the combination of an elongated recording arm pivotable over a chart to recording positions corresponding to the values of a variable condition whose behavior is to be recorded, marking means carried at the end of said recording arm and constructed to mark intermittently on said chart the recording position of said recording arm, changing mechanism having a series of parts successively and mechanically connectable with the marking means after each marking operation to change the marking means for the next marking operation, and entirely disconnectable from said marking means to leave said recording arm and marking means free during such marking operation.

10. In an industrial multi-record recorder the combination of an elongated recording arm pivotable over a chart to successive recording positions corresponding to the values of variable conditions whose behaviors are to be recorded, marking mechanism mounted at the end of said recording arm and constructed to mark intermittently on said chart the successive recording positions, conditioning mechanism having a series of parts successively and mechanically connectable with said marking mechanism after each marking operation to condition it for the next marking operation to identify the mark made with the variable condition, and thereafter entirely disconnectable from said marking mechanism to leave it and said recording arm free during such marking operation.

11. In a periodically-operating recording mechanism, in combination, a condition-responsive member normally positioned in accordance with the values of a variable to be recorded, a pen arm positionable by said condition-responsive member over a chart and carrying a pen operative intermittently to mark thereon the recording position of said arm, a pen holder associated with said pen arm and housing a plurality of pens, and pen changing mechanism being normally mechanically disconnected from said pen arm, but being mechanically connectable with said pen arm and pen holder after each marking operation to relatively move the pen arm and pen holder to change the pen for the next marking operation.

12. In an industrial multi-record recorder, the combination of a condition-responsive part successively positioned in accordance with the values of variables whose behaviors are to be recorded, a recording member, a releasable connection between said part and recording member operative to position said recording member over a chart to successive recording positions corresponding to the successive positions of said part, marking means carried by said recording member constructed to mark intermittently on said chart the successive recording positions of said recording member, conditioning mechanism spaced from said chart at a fixed location and operative on said marking means to condition it for each marking operation to identify the mark produced with the corresponding variable condition, a drive operative to move the recording member from its association with said part and to move said marking means to said conditioning mechanism for the conditioning operation, and thereafter to re-establish said connection to enable said part to position the recording member at recording position for the next marking operation.

13. In an industrial recording instrument, in combination, a condition-responsive member positioned in correspondence with the values of a variable to be recorded, a recording arm normally operatively connected to and moved by said condition-responsive member to recording positions over a chart, a holder on said arm removably carrying a marking device, operating mechanism operative to cause said marking device to mark intermittently on said chart the recording positions of said arm, a magazine holding a plurality of marking devices and constructed to change the marking device held by said holder, and drive mechanism after each marking operation moving said arm from its operative connection with said member to said magazine for said device changing operation, and thereafter returning said arm to its operative connection with said member.

14. In an industrial recording instrument for recording on a single chart the values of a plurality of different variables, in combination, a condition-responsive member successively movable to positions corresponding respectively to the values of the several variables, a pen arm operatively connectable with, disconnectable from, and movable by said condition-responsive member over said chart to recording positions, printing mechanism operative to cause said pen arm to print intermittently on said chart the recording positions of said pen arm, and drive mechanism operative after each printing operation to move said pen arm from its operative connection with said condition-responsive member, and thereafter to return said pen arm to said operative connection.

15. In an industrial recording instrument for recording on a single chart the values of a plurality of different variables, in combination, a condition-responsive member successively movable to positions corresponding respectively to the values of the several variables, a pen arm operatively connectable with, disconnectable from, and movable by said condition-responsive member over said chart to recording positions, printing mechanism operative to cause said pen arm to print intermittently on said chart the recording positions of said pen arm, and drive mechanism operative after each printing operation to move said pen arm from its operative connection with said condition-responsive member, and thereafter to return said pen arm to said operative connection, and inking mechanism operative on said pen arm to change its color identification after each printing operation and while said pen arm is operatively disconnected from said condition-responsive member.

16. In an industrial multi-record recorder, measuring mechanism connectable successively to a plurality of measuring elements respectively responsive to a plurality of variable conditions whose behaviors are to be recorded, a positioning member movable by said measuring mechanism to successive positions respectively corresponding to the values of said variable conditions, a freely pivotable bail movable onto and out of contact with said positionable member, a recording arm carried by said bail and when said bail is in contact with said positionable member being positioned thereby over a chart at recording positions corresponding to the successive positions of said positioning member, marking means carried by said recording arm constructed to mark intermittently on said chart the successive recording positions, conditioning mechanism mounted at a fixed location space from said chart and operative on said marking means to condition it after each marking operation to provide it with a characteristic corresponding to the variable condition whose value is next to be marked on said chart, a drive alternately moving said bail from said positioning member to move said marking means to said conditioning mechanism for the conditioning operation and returning said bail to said positioning member for the marking operation, and switching mechanism operative after each marking operation to disconnect said measuring mechanism from the measuring element whose value has just been marked and to connect said measuring mechanism with the next measuring element.

17. An industrial recorder as described in claim 16 and in which said measuring mechanism is a pneumatically operated device having a part movable in accordance with air pressure received by said device, said part being linked to said positioning member, and in which said switching mechanism is a pneumatic switch.

18. An industrial recorder as described in claim 16 and in which a common drive shaft periodically operates said drive, said conditioning mechanism and said switching mechanism in fixed sequence.

19. In an industrial multi-record recorder, in combination, a plurality of measuring mechanisms constructed to continually measure the respective values of a plurality of measuring elements responsive respectively to a plurality of variable conditions whose behaviors are to be recorded, a plurality of positioning members respectively connected to and continuously positioned by said measuring mechanisms in accordance with said values, a freely pivoted bail carrying a recording arm movable thereby over a chart, connecting mechanism operative to successively connect said bail with the positioning members one at a time, and to leave said bail free of the positioning members not connected, thereby to move said recording arm to successive recording positions over said chart corresponding to the value of the measuring element associated with the successively connected positioning member, marking means carried by said recording arm constructed to mark intermittently on said chart the successive recording positions, conditioning mechanism at a fixed location spaced from said chart and operative on said marking means to condition it after each marking operation to provide it with a marking characteristic corresponding to the variable conditions whose value is next to be marked on said chart, a drive alternately moving said bail and recording arm from said connecting mechanism to move said marking means to said conditioning mechanism for the conditioning operation and returning said bail to said connecting mechanism for the next marking operation, and selecting mechanism operating said connecting mechanism in timed sequence with said marking operation to change the measuring mechanism connected to said bail by said connecting mechanism after each printing operation.

20. An industrial recorder constructed as set forth in claim 19 and in which said connecting mechanism includes a plurality of bail-operating arms respectively biased into operating contact with said positioning members, and in such contact being constructed to position said bail in accordance with the positions of said positioning members, and said selecting mechanism including a plurality of selector arms respectively connected to said bail-operating arms, and cam means operative to move the selector arms and bail operating arms against their bias out of contact with said positioning members and out of the path of said bail, and being operative to selectively release said selector arms one at a time to release the corresponding bail-operating arm to contact its positioning member and to position the bail, said cam means being operated in steps to release the selector arms in sequence.

21. In an industrial multi-record recorder, in combination, a plurality of measuring mechanisms constructed to continuously measure the respective values of a plurality of measuring elements responsive respectively to a plurality of variable conditions whose behaviors are to be recorded, a plurality of positioning members respectively connected to and continuously positioned by said measuring mechanisms in accordance with said values, a freely pivoted bail carrying a recording arm movable thereby over a chart, and selectively positionable by said positioning members one at a time thereby to move said recording arm to successive recording positions over said chart corresponding to the values of the measuring elements, marking means carried by said recording arm constructed to mark intermittently on said chart the successive recording positions, conditioning mechanism at a fixed location spaced from said chart and operative on said marking means to condition it after each marking operation to provide it with a marking characteristic corresponding to the variable condition whose value is next to be marked on said chart, a drive alternately moving said bail from said positioning members to move said recording arm and marking means to said conditioning mechanism for the conditioning operation and returning said bail to be positioned by the next succeeding positioning member for the next marking operation.

22. An industrial recorder according to claim 14 and wherein said pen arm has a support comprising two parallel flexure arms, a rigid support spacing and holding said flexure arms at one end, a spacer secured to the free ends of said flexure arms and spacing them a fixed amount equal to the spacing provided by said rigid support, and bearing means supported by said flexure arms at their free ends and pivotally supporting said pen arm, and said printing mechanism intermittently flexes said flexure arms to move said pen arm into marking contact with said chart.

23. An industrial recorder of the construction set forth in claim 22 and in which said flexure arms are spring-biased to move the pen arm into printing contact with said chart and in which said printing mechanism is mechanically connected to said flexure arms and is operative intermittently to release said flexure arms to move said pen arm into printing contact with said chart.

References Cited in the file of this patent

UNITED STATES PATENTS

| Number | Name | Date |
|---|---|---|
| 923,606 | Thwing | June 1, 1909 |
| 1,418,183 | Thwing | May 30, 1922 |
| 2,082,591 | Newman | June 1, 1937 |
| 2,125,345 | Hunt | Aug. 2, 1938 |
| 2,191,673 | Moore | Feb. 27, 1940 |
| 2,315,348 | O'Brien | Mar. 30, 1943 |
| 2,331,205 | Lenehan | Oct. 5, 1943 |
| 2,412,639 | Traugott | Dec. 17, 1946 |
| 2,425,080 | Blakeslee | Aug. 5, 1947 |
| 2,454,966 | Faus | Nov. 30, 1948 |

FOREIGN PATENTS

| Number | Country | Date |
|---|---|---|
| 56,658 | Netherlands | July 15, 1944 |